(12) United States Patent
Lee et al.

(10) Patent No.: US 12,309,754 B2
(45) Date of Patent: May 20, 2025

(54) METHOD AND DEVICE FOR CONTROLLING RESOURCE AND POWER OF FULL DUPLEX OPERATION IN A WIRELESS COMMUNICATION SYSTEM

(71) Applicant: SAMSUNG ELECTRONICS CO., LTD., Suwon-si (KR)

(72) Inventors: Kwonjong Lee, Suwon-si (KR); Jaehyun Lee, Suwon-si (KR); Hyojin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 379 days.

(21) Appl. No.: 17/756,801

(22) PCT Filed: Dec. 4, 2020

(86) PCT No.: PCT/KR2020/017646
§ 371 (c)(1),
(2) Date: Jun. 2, 2022

(87) PCT Pub. No.: WO2021/112622
PCT Pub. Date: Jun. 10, 2021

(65) Prior Publication Data
US 2023/0031806 A1 Feb. 2, 2023

(30) Foreign Application Priority Data
Dec. 6, 2019 (KR) .......................... 10-2019-0161675

(51) Int. Cl.
*H04W 72/0453* (2023.01)
*H04L 5/14* (2006.01)

(52) U.S. Cl.
CPC ........... *H04W 72/0453* (2013.01); *H04L 5/14* (2013.01)

(58) Field of Classification Search
CPC .......................... H04W 72/0453; H04L 5/14
See application file for complete search history.

(56) References Cited

U.S. PATENT DOCUMENTS 9,277,513 B2   3/2016  Kim et al.
10,721,692 B2 *  7/2020  Kishiyama ............ H04W 24/02
(Continued)

FOREIGN PATENT DOCUMENTS

EP          3927068 A1    12/2021
JP       2015512577 A      4/2015
(Continued)

OTHER PUBLICATIONS

International Search Report and Written Opinion of the International Searching Authority in connection with International Application No. PCT/KR2020/017646 issued Mar. 9, 2021, 9 pages.
(Continued)

*Primary Examiner* — Chi H Pham
*Assistant Examiner* — Weibin Huang

(57) ABSTRACT

A user equipment (UE) for transmitting and receiving signals in a wireless communication system according to an embodiment of the disclosure includes: a transceiver; and at least one processor configured to control the transceiver, wherein the at least one processor is further configured to control the transceiver to receive, from a base station (BS), full duplex carrier resource block (FD CRB) information, identify at least one resource block usable for uplink data transmission, based on the FD CRB information, and control the transceiver to transmit uplink data by using the identified at least one resource block.

18 Claims, 24 Drawing Sheets

(56) References Cited

U.S. PATENT DOCUMENTS

| | | | |
|---|---|---|---|
| 10,791,522 B2* | 9/2020 | Wu | H04W 72/0473 |
| 2012/0263047 A1 | 10/2012 | Love et al. | |
| 2013/0028117 A1 | 1/2013 | Montojo et al. | |
| 2013/0223294 A1* | 8/2013 | Karjalainen | H04L 5/1438 |
| | | | 370/277 |
| 2013/0250923 A1 | 9/2013 | Koorapaty et al. | |
| 2016/0095118 A1 | 3/2016 | Mizusawa | |
| 2016/0127114 A1 | 5/2016 | Kim et al. | |
| 2019/0320421 A1* | 10/2019 | Al-Imari | H04W 72/23 |
| 2019/0335471 A1 | 10/2019 | Kim et al. | |
| 2019/0357149 A1* | 11/2019 | Zhang | H04W 52/146 |
| 2020/0229112 A1* | 7/2020 | John Wilson | H04W 52/367 |
| 2021/0028814 A1 | 1/2021 | Lee et al. | |
| 2021/0051660 A1* | 2/2021 | Askar | H04B 7/0854 |

FOREIGN PATENT DOCUMENTS

| | | |
|---|---|---|
| JP | 6215370 B2 | 10/2017 |
| KR | 10-2014-0056312 A | 5/2014 |
| KR | 10-2014-0060486 A | 5/2014 |
| KR | 10-2015-0058543 A | 5/2015 |
| KR | 10-2016-0019431 A | 2/2016 |
| KR | 10-2018-0098388 A | 9/2018 |
| KR | 10-2020-0122147 A | 10/2020 |
| KR | 10-2021-0012303 A | 2/2021 |
| WO | 2017/217630 A1 | 12/2017 |

OTHER PUBLICATIONS

Translation of the Written Opinion of the International Searching Authority in connection with International Application No. PCT/KR2020/017646 issued Mar. 9, 2021, 7 pages.

Ericsson, "IAB resource configuration and assignment", 3GPP TSG-RAN WG1 Meeting #96, Mar. 1-25, 2019, R1-1903226, 6 pages.

Supplementary European Search Report dated Nov. 29, 2022 in connection with European Patent Application No. 20 89 7025.1, 7 pages.

Office Action issued Mar. 10, 2025, in connection with Korean Patent Application No. 10-2019-0161675, 40 pages.

* cited by examiner

FD CRB SET LIST

| INDEX | FD CRB | FD CRB CONFIGURATION CONDITION |
|---|---|---|
| 1 | CRB5, CRB6, CRB7, CRB11, CRB12, CRB13, CRB14, CRB 15 | |
| 2 | CRB4, CRB5, CRB6, CRB7, CRB8, CRB9, CRB11, CRB12, CRB13, CRB14, CRB15, CRB16, CRB17 | |
| 3 | CRB5, CRB6 | |
| 4 | CRB0 - CRB19 | |
| ... | ... | |

METHOD AND DEVICE FOR CONTROLLING RESOURCE AND POWER OF FULL DUPLEX OPERATION IN A WIRELESS COMMUNICATION SYSTEM

CROSS-REFERENCE TO RELATED APPLICATIONS

This application is a 371 of International Application No. PCT/KR2020/017646, filed Dec. 4, 2020, which claims priority to Korean Patent Application No. 10-2019-0161675, filed Dec. 6, 2019, the disclosures of which are herein incorporated by reference in their entirety.

BACKGROUND

1. Field

The disclosure relates to support for a full duplex operation in a wireless communication system, and more particularly, to a power control method and apparatus for efficiently using a full duplex operation in a wireless communication system.

2. Description of Related Art

In order to meet increasing demand with respect wireless data traffic after the commercialization of 4th generation (4G) communication systems, efforts have been made to develop 5th generation (5G) or pre-5G communication systems. For this reason, 5G or pre-5G communication systems are called 'beyond 4G network' communication systems or 'post long term evolution (post-LTE)' systems. In order to achieve high data rates, implementation of 5G communication systems in an ultra-high frequency millimeter-wave (mmWave) band (e.g., a 60-gigahertz (GHz) band) is being considered. In order to reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. In order to improve system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation by a receiver have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA) have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. In order to implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology using beamforming, MIMO, and array antennas. Application of cloud radio access network (Cloud-RAN) as the above-described big data processing technology may be an example of convergence of 5G communication technology and IoT technology.

Because various services may be provided due to the aforementioned technical features and the development of wireless communication systems, there is a demand for methods for seamlessly providing these services. In particular, there is a demand for a communication method for saving power of a user equipment (UE) so as to provide a service to a user for a longer period of time and a method of reporting channel state information by considering the power of the UE.

SUMMARY

Based on the discussions above, the disclosure provides a method by which a user equipment (UE) supporting a full duplex operation transmits and receives signals in a wireless communication system.

According to an embodiment of the disclosure, provided are a user equipment (UE) configured to transmit and receive signals in a wireless communication system and an operating method of the UE. The UE for transmitting and receiving signals in a wireless communication system may include: a transceiver; and at least one processor configured to control the transceiver. The at least one processor may be further configured to control the transceiver to receive, from a base station (BS), full duplex carrier resource block (FD CRB) information, identify a resource element usable for uplink data transmission, based on the FD CRB information, and control the transceiver to transmit uplink data by using the identified resource element.

According to an embodiment of the disclosure, provided are a base station (BS) configured to transmit and receive signals in a wireless communication system and an operating method of the BS. The BS for transmitting and receiving signals in a wireless communication system may include: a transceiver; and at least one processor configured to control the transceiver. Here, the at least one processor may be further configured to obtain full duplex carrier resource block (FD CRB) information, control the transceiver to transmit the FD CRB information, and control the transceiver to receive uplink data by using a resource element being usable for uplink data reception and being identified based on the FD CRB information.

As a transport resource being usable for an uplink (UL) in a wireless communication system is additionally assured according to disclosed embodiments, data may be effectively transmitted and received.

DETAILED DESCRIPTION

Figure 1:
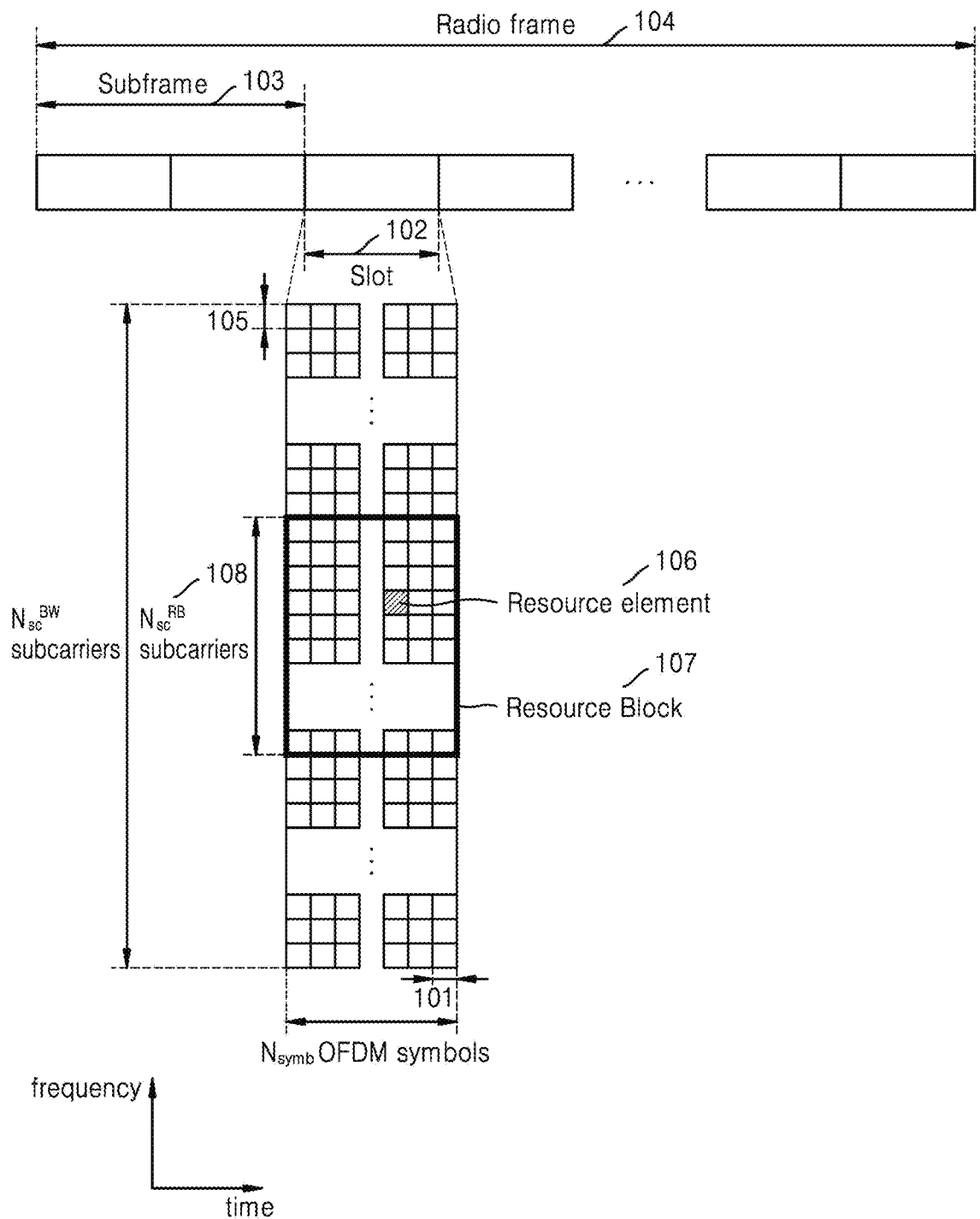
FIG. 1 is a diagram illustrating a basic structure of a time-frequency domain that is a radio resource region in which data or a control channel is transmitted in a long term evolution (LTE) system.

According to an embodiment of the disclosure, provided is a user equipment (UE) configured to transmit and receive signals in a wireless communication system. The UE may include: a transceiver; and at least one processor configured to control the transceiver, wherein the at least one processor is further configured to control the transceiver to receive full duplex carrier resource block (FD CRB) information from a base station (BS), identify at least one resource block usable for uplink data transmission, based on the FD CRB information, and control the transceiver to transmit uplink data by using the identified at least one resource block.

According to an embodiment, the FD CRB information may be indicated by an index corresponding to an FD CRB configuration condition, and the FD CRB configuration condition may include a characteristic of the BS which is associated with a self-interference channel.

According to an embodiment, a frequency band of the at least one resource block being usable for uplink data transmission and being identified based on the FD CRB information may correspond to a partial frequency band among a full frequency band usable for downlink data reception from the BS.

According to an embodiment, the at least one processor may be further configured to control the transceiver to receive downlink data from the BS by using the at least one resource block usable for uplink data transmission.

According to an embodiment, the at least one processor may be further configured to control the transceiver not to receive downlink data from the BS by using the at least one resource block usable for uplink data transmission.

According to an embodiment, the at least one resource block being usable for uplink data transmission may correspond to a partial frequency band among a full frequency band, and a frequency band except for the partial frequency band among the full frequency band may be a frequency band usable for downlink data reception from the BS.

According to an embodiment, the FD CRB information may include information about a resource block set including the at least one resource block usable for uplink data transmission by the UE, and the information about the resource block set may include at least one of position information of the at least one resource block, number information, or index information indicating the resource block set.

According to an embodiment, a frequency band of the at least one resource block may correspond to a partial frequency band allocated from the BS for the UE to receive uplink data among a full frequency band of the BS, and the frequency band of the at least one resource block may be allocated based on an FD CRB configuration condition.

According to an embodiment of the disclosure, provided is a BS configured to transmit and receive signals in a wireless communication system. The BS may include a transceiver; and at least one processor configured to control the transceiver, wherein the at least one processor is further configured to obtain FD CRB information, control the transceiver to transmit the FD CRB information, and control the transceiver to receive uplink data by using at least one resource block being usable for uplink data reception and being identified based on the FD CRB information.

According to an embodiment, the FD CRB information may be indicated by an index corresponding to an FD CRB configuration condition, and the FD CRB configuration condition may include a characteristic of the BS which is associated with a self-interference channel.

According to an embodiment, a frequency band of the at least one resource block being usable for uplink data reception and being identified based on the FD CRB information may correspond to a partial frequency band among a full frequency band usable for downlink data transmission to a UE.

According to an embodiment, the at least one processor may be further configured to control the transceiver to transmit downlink data to a UE by using the at least one resource block usable for uplink data reception.

According to an embodiment, the at least one processor may be further configured to control the transceiver not to transmit downlink data to a UE by using the at least one resource block usable for uplink data reception.

According to an embodiment, the FD CRB information may include information about a resource block set including the at least one resource block usable for uplink data reception, and the information about the resource block set may include at least one of position information of the at least one resource block, number information, or index information indicating the resource block set.

According to an embodiment of the disclosure, provided is a method, performed by a UE, of transmitting and receiving signals in a wireless communication system. The method, performed by the UE, of transmitting and receiving signals may include receiving FD CRB information from a BS, identifying at least one resource block usable for uplink data transmission, based on the FD CRB information, and transmitting uplink data by using the identified at least one resource block.

A UE for transmitting and receiving signals in a wireless communication system according to an embodiment of the disclosure may include: a transceiver; and at least one processor configured to control the transceiver, wherein the at least one processor is further configured to control the transceiver to receive FD CRB information from a BS, identify at least one resource element usable for uplink data transmission, based on the FD CRB information, and control the transceiver to transmit uplink data by using the identified at least one resource element.

According to an embodiment, the FD CRB information may be indicated by an index corresponding to an FD CRB configuration condition, and the FD CRB configuration condition may include at least one of the number of ports, a port type, or transmission power.

According to an embodiment, the at least one processor may be further configured to control the transceiver to receive the FD CRB information by radio resource control (RRC) signaling or downlink control information (DCI) including the FD CRB information.

According to an embodiment, the at least one processor may be further configured to control the transceiver to receive a channel-state information reference signal (CSI-RS) by using the identified resource element, control the transceiver to transmit and may be further configured to the BS, a channel quality indicator (CQI) determined based on the received CSI-RS, and as transmission power for the resource element identified based on the FD CRB information is adjusted, transmission power for a physical downlink shared channel (PDSCH) among the CSI-RS and the PDSCH which are received via the identified resource element.

According to an embodiment, the at least one processor may be further configured to: obtain preset transmission power pattern information from the BS; control the transceiver to receive a transmission power change indicator from the BS at a time identified based on the transmission power pattern information; and measure a CQI based on a CSI-RS transmitted with transmission power changed based on a transmission power pattern.

According to an embodiment, the at least one processor may be further configured to: control the transceiver to receive a transmission power indicator from the BS; and measure a CQI based on a CSI-RS transmitted based on transmission power corresponding to the transmission power indicator.

According to an embodiment, the at least one processor may be further configured to: identify an FD CRB set from the FD CRB information; determine a virtual resource block (VRB) number with respect to each FD CRB included in the FD CRB set, based on a resource allocation possibility; and identify a CRB as the resource element, the CRB having a VRB number for an FD CRB corresponding to a resource block number allocated for the UE as an uplink resource.

According to an embodiment, the at least one processor may be further configured to: identify an FD CRB set from the FD CRB information; sequentially determine, based on a CRB order, VRB numbers for respective FD CRBs included in the FD CRB set; and identify a CRB as the resource element, the CRB having a VRB number for an FD CRB corresponding to a resource block number allocated for the UE as an uplink resource.

According to an embodiment, the at least one processor may be further configured to: identify an FD CRB set from the FD CRB information, and identify a resource block as the resource element, the resource block overlapping in the FD CRB set and an uplink PDSCH resource block region allocated by a resource indication value (RIV).

A BS for transmitting and receiving signals in a wireless communication system according to an embodiment of the disclosure may include: a transceiver; and at least one processor configured to control the transceiver, wherein the at least one processor is further configured to obtain FD CRB information, control the transceiver to transmit the FD CRB information, and control the transceiver to receive uplink data by using a resource element being usable for uplink data reception and being identified based on the FD CRB information.

According to an embodiment, the FD CRB information may be indicated by an index corresponding to an FD CRB configuration condition, and the FD CRB configuration condition may include at least one of the number of ports, a port type, or transmission power.

According to an embodiment, the at least one processor may be further configured to control the transceiver to transmit the FD CRB information by RRC signaling or DCI.

According to an embodiment, the FD CRB information may include information about transmission power to be adjusted for the resource element usable for uplink data transmission, and the at least one processor may be further configured to: adjust, based on the adjusted transmission power, transmission power for a PDSCH among the PDSCH and a CSI-RS which are transmitted by using the identified resource element; and control the transceiver to transmit the PDSCH and the CSI-RS, based on a result of the adjustment.

According to an embodiment, the at least one processor may be further configured to: control the transceiver to transmit a transmission power change indicator to a UE at a time of transmission power change; change transmission power, based on preset transmission power pattern information; and control the transceiver to transmit a CSI-RS based on changed transmission power.

According to an embodiment, the at least one processor may be further configured to: control the transceiver to transmit a transmission power indicator to the UE; and control the transceiver to transmit a CSI-RS based on transmission power corresponding to the transmission power indicator.

Hereinafter, embodiments of the disclosure will now be described more fully with reference to the accompanying drawings.

In the following descriptions of embodiments, descriptions of techniques that are well known in the art and are not directly related to the disclosure are omitted. By omitting unnecessary descriptions, the essence of the disclosure may not be obscured and may be explicitly conveyed.

For the same reason, some elements in the drawings are exaggerated, omitted, or schematically illustrated. Also, the size of each element does not entirely reflect the actual size. In the drawings, the same or corresponding elements are denoted by the same reference numerals.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein. Rather, these embodiments are provided so that the disclosure will be thorough and complete and will fully convey the concept of the disclosure to one of ordinary skill in the art, and the disclosure will only be defined by the appended claims. Throughout the specification, like reference numerals denote like elements.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block(s). The computer program instructions may also be stored in a computer-executable or computer-readable memory that may direct the computer or other programmable data processing apparatus to function in a particular manner, such that the instructions stored in the computer-executable or computer-readable memory may produce an article of manufacture including instruction means that perform the functions specified in the flowchart block(s). The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide operations for implementing the functions specified in the flowchart block(s).

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term " . . . unit" as used in the present embodiment refers to a software or hardware component, such as field-programmable gate array (FPGA) or application-specific integrated circuit (ASIC), which performs certain tasks. However, the term " . . . unit" does not mean to be limited to software or hardware. A " . . . unit" may be configured to be in an addressable storage medium or configured to operate one or more processors. Thus, according to some embodiments, a " . . . unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the elements and " . . . units" may be combined into fewer elements and " . . . units" or further separated into additional elements and " . . . units". Further, the elements and " . . . units" may be implemented to operate one or more central processing units (CPUs) in a device or a secure multimedia card. Also, according to some embodiments, a " . . . unit" may include one or more processors.

Hereinafter, operational principles of the disclosure will be described in detail with reference to accompanying drawings. In the description of the disclosure, detailed descriptions of the related art are omitted when it is deemed that they may unnecessarily obscure the essence of the disclosure. The terms used in the specification are defined in consideration of functions used in the disclosure, and can be changed according to the intent or commonly used methods of users or operators. Accordingly, definitions of the terms are understood based on the entire description of the present specification. Hereinafter, a base station is an entity that allocates resources to a terminal, and may be at least one of a next-generation node B (gNode B), an evolved node B (eNode B), a Node B, a base station (BS), a radio access unit, a BS controller, or a node on a network. A terminal may include a user equipment (UE), a mobile station (MS), a cellular phone, a smartphone, a computer, or a multimedia system capable of performing a communication function. However, the disclosure is not limited to the above example. Hereinafter, the disclosure provides descriptions of a technology by which a UE receives broadcasting information from a BS in a wireless communication system. The disclosure relates to a communication technique and system therefor for converging an Internet of Things (IoT) technology and a 5th generation (5G) communication system for supporting a higher data rate after a 4th generation (4G) system. The disclosure is applicable to intelligent services (e.g., smart home, smart building, smart city, smart car or connected car, health care, digital education, retail, security, and safety services) based on 5G communication technology and IoT technology.

Hereinafter, terms indicating broadcasting information, terms indicating control information, terms related to communication coverage, terms indicating a state change (e.g., event), terms indicating network entities, terms indicating messages, terms indicating elements of an apparatus, or the like, as used in the following description, are exemplified for convenience of descriptions. Accordingly, the disclosure is not limited to terms to be described below, and other terms indicating objects having equal technical meanings may be used.

Hereinafter, for convenience of descriptions, some terms and names defined in the 3rd Generation Partnership Project Long Term Evolution (3GPP LTE) standard may be used. However, the disclosure is not limited to these terms and names, and may be equally applied to systems conforming to other standards.

Wireless communication systems providing voice-based services in early stages are being developed to broadband wireless communication systems providing high-speed and high-quality packet data services according to communication standards such as high speed packet access (HSPA), long term evolution (LTE) or evolved universal terrestrial radio access (E-UTRA), LTE-advanced (LTE-A), LTE-Pro of 3GPP, high rate packet data (HRPD), ultra mobile broadband (UMB) of 3GPP2, and 802.16e of the Institute of Electrical and Electronics Engineers (IEEE).

As a representative example of the broadband wireless communication systems, LTE systems employ orthogonal frequency division multiplexing (OFDM) for a downlink (DL) and employs single carrier-frequency division multiple access (SC-FDMA) for an uplink (UL). The UL refers to a radio link for transmitting data or a control signal from a terminal (e.g., a UE or an MS) to a base station (e.g., an eNB or a BS), and the DL refers to a radio link for transmitting data or a control signal from the base station to the terminal. The above-described multiple access schemes identify data or control information of each user in a manner that time-frequency resources for carrying the data or control information of each user are allocated and managed not to overlap each other, that is, to achieve orthogonality therebetween.

As post-LTE communication systems, i.e., 5G communication systems need to support services capable of freely reflecting and simultaneously satisfying various requirements of users, service providers, and the like. Services considered for the 5G systems include enhanced mobile broadband (eMBB), massive machine-type communication (mMTC), ultra-reliability low-latency communication (URLLC) services, or the like.

According to some embodiments, the eMBB aims to provide an improved data rate than a data rate supported by the legacy LTE, LTE-A, or LTE-Pro. For example, in a 5G communication system, the eMBB should be able to provide a peak data rate of 20 Gbps in a DL and a peak data rate of 10 Gbps in an UL at one BS. Also, it has to simultaneously provide a peak data rate and an increased user-perceived data rate of a terminal. In order to satisfy such requirements, there is a need for improvement in various transmission/reception technologies including an improved multiple-input multiple-output (MIMO) transmission technology. Also, a data rate required in the 5G communication system may be satisfied as the 5G communication system uses a frequency bandwidth wider than 20 MHz in the 3 GHz to 6 GHz or 6 GHz or more frequency band, while the legacy LTE uses a 2 GHz band.

Simultaneously, the mMTC is being considered to support application services such as IoT in 5G communication systems. In order to efficiently provide the IoT, the mMTC may require the support for a large number of terminals in a cell, improved coverage for a terminal, improved battery time, reduced costs of a terminal, and the like. Because the IoT is attached to various sensors and various devices to provide a communication function, the mMTC should be able to support a large number of terminals (e.g., 1,000,000 terminals/km2) in a cell. Also, because a terminal supporting the mMTC is likely to be located in a shadow region failing to be covered by the cell, such as the basement of a building, due to the characteristics of the service, the terminal may require wider coverage than other services provided by the 5G communication systems. The terminal supporting the mMTC should be configured as a low-cost terminal and may require a very long battery life time such as 10 to 15 years because it is difficult to frequently replace the battery of the terminal.

Lastly, the URLLC refers to cellular-based wireless communication services used for mission-critical purposes such as services for remote control of robots or machinery, industrial automation, unmanned aerial vehicles, remote health care, emergency alerts, and the like, and should provide communications providing ultra-low latency and ultra reliability. For example, a service supporting the URLLC should satisfy air interface latency of less than 0.5 milliseconds, and simultaneously has a requirement for a packet error rate of 10-5 or less. Thus, for the service supporting the URLLC, the 5G system should provide a transmit time interval (TTI) smaller than other services and may simultaneously have a design requirement for allocating wide resources in a frequency band. However, the above-described mMTC, URLLC, and eMBB services are merely examples and the types of services to which the disclosure is applicable are not limited thereto.

The services considered in the 5G communication system need to be provided after being converged based on one framework. That is, in order to efficiently managing and controlling resources, it is preferable that the services are combined into one system and then are controlled and transmitted, rather than independently operating.

Although LTE, LTE-A, LTE Pro, or New Radio (NR) systems are mentioned as examples in the following description, embodiments of the disclosure may also be applied to other communication systems having similar technical backgrounds or channel types. Furthermore, the embodiments of the disclosure may also be applied to other communication systems through partial modification without greatly departing from the scope of the disclosure based on determination by one of ordinary skill in the art.

Hereinafter, a frame structure of LTE and LTE-A systems will now be described in detail with reference to drawing.

FIG. 1 is a diagram illustrating a basic structure of a time-frequency domain that is a radio resource region in which data or a control channel is transmitted in an LTE system.

Referring to FIG. 1, the horizontal axis represents a time domain and the vertical axis represents a frequency domain. A minimum transmission unit in the time domain is an OFDM symbol 101, and Nsymb OFDM symbols 101 are gathered to constitute one slot 102, and two slots are gathered to constitute one subframe 103. A length of the slot 102 is 0.5 ms, and a length of the subframe 103 is 1.0 ms. A radio frame 104 is a time-domain unit including 10 subframes 103. A minimum transmission unit in a frequency domain is a subcarrier 105, and a bandwidth of a full system transmission bandwidth is composed of NBW subcarriers 105.

A basic unit of a resource in the time-frequency domain may be a resource element (RE) 106, and an RE may be defined as an OFDM symbol index and a subcarrier index. A resource block (RB) or a physical resource block (PRB) 107 is defined as Nsymb consecutive OFDM symbols 101 in the time domain and NRB consecutive subcarriers 108 in the frequency domain. Therefore, one RB 107 includes Nsymb× NRB REs 106. In general, a minimum transmission unit of data may be the RB unit. In the LTE system, in general, Nsymb=7, NRB=12, and NBW and NRB are proportional to a bandwidth of a system transmission band.

Next, downlink control information (DCI) in the LTE and LTE-A systems will now be described in detail.

Scheduling information for DL data or UL data in the LTE system is transmitted from a BS to a UE via DCI. The DCI may include information about whether it is scheduling information for UL data or scheduling information for DL data, information about whether the DCI is a compact DCI having a small size of control information, information about whether spatial multiplexing using multiple antennas is applied, information about whether the DCI is DCI for power control, and the like. Also, DCI formats defined based on the plurality of pieces of information may be applied and operated. For example, DCI format 1 that is scheduling control information about DL data is configured to at least include a plurality of pieces of information below.

Resource allocation type 0/1 flag: Notifies whether the resource allocation scheme is type 0 or type 1. Type 0 allocates a resource in a resource block group (RBG) unit by applying a bitmap scheme. In the LTE system, a basic unit of scheduling is a RB represented by time and frequency domain resources, and an RBG consists of a plurality of RBs and is the basic unit of the scheduling in the type 0 scheme. Type 1 allows specific RBs to be allocated within the RBG.

Resource block assignment: Notifies RBs assigned for data transmission. Resources represented according to the system bandwidth and resource assignment scheme are determined.

Modulation and Coding Scheme (MCS): Notifies a modulation scheme used for data transmission and a size of a transport block that is data to be transmitted.

Hybrid automatic repeat request (HARQ) process number: Notifies an HARQ process number.

New data indicator: Notifies whether it is HARQ initial transmission or HARQ retransmission.

Redundancy version: Notifies a redundancy version of HARQ.

Transmit power control (TPC) command for physical uplink control channel (PUCCH): Notifies a transmit power control command for PUCCH that is a UL control channel.

The DCI is transmitted via a physical downlink control channel (PDCCH), which is a DL physical control channel, after a channel coding and modulation procedure.

A cyclic redundancy check (CRC) is attached to a DCI message payload, and is scrambled by a radio network temporary identifier (RNTI) corresponding to identity of the UE. Different RNTIs are used according to the purpose of the DCI message, e.g., UE-specific data transmission, a power control command, a random access response, or the like. That is, the RNTI is not explicitly transmitted, but is transmitted by being included in a CRC calculation process. When receiving a DCI message transmitted on a PDCCH, the UE may check a CRC by using an allocated RNTI, and when a result of checking the CRC is correct, the UE may identify that the corresponding message has been transmitted to the UE.

Figure 2:
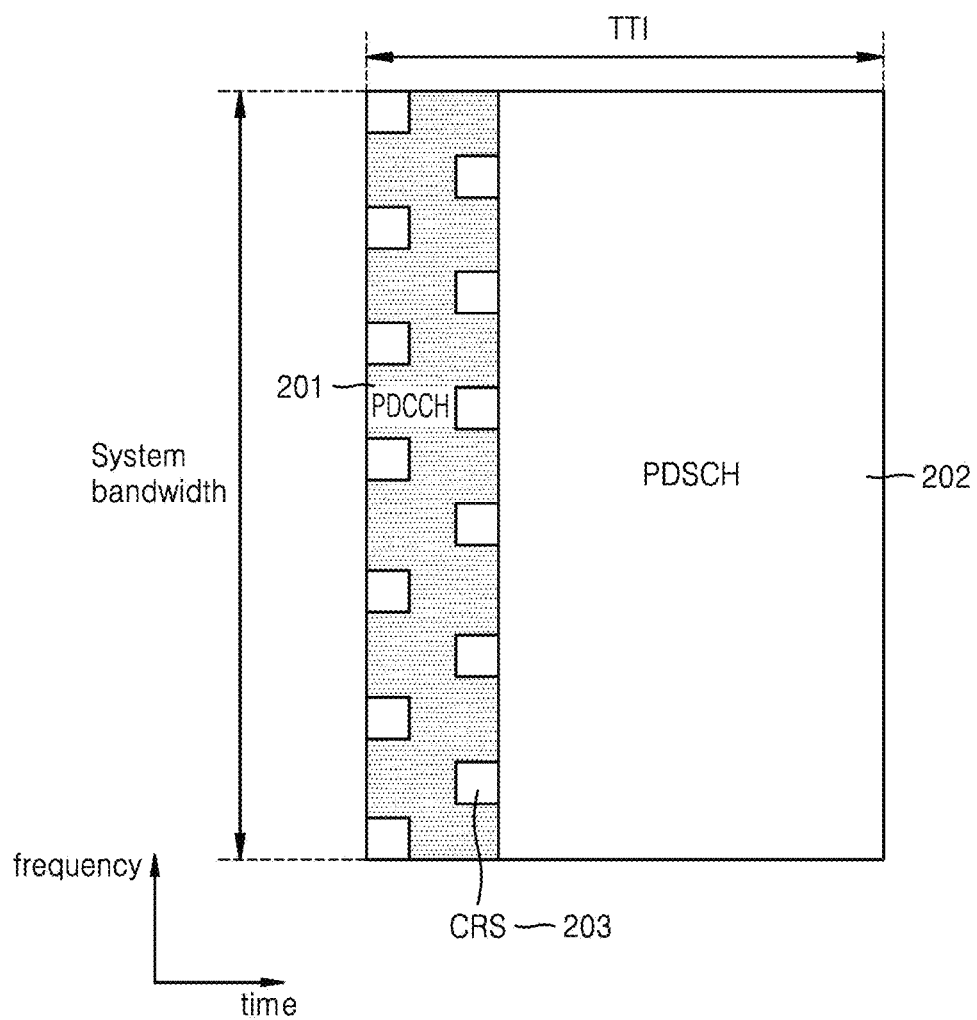
FIG. 2 is a diagram illustrating a physical downlink control channel (PDCCH) that is a downlink (DL) physical channel on which downlink control information (DCI) of LTE is transmitted.

FIG. 2 is a diagram illustrating a PDCCH that is a DL physical channel on which DCI of LTE is transmitted.

Referring to FIG. 2, a PDCCH 201 is time-multiplexed with a physical downlink shared channel (PDSCH) 202, which is a data transmission channel, and is transmitted over a full system bandwidth. A region of the PDCCH 201 is represented as the number of OFDM symbols, and this may be indicated to the UE as a control format indicator (CFI) transmitted via a physical control format indicator channel (PCFICH).

By allocating the PDCCH 201 to an OFDM symbol located at a start of a subframe, the UE may decode DL scheduling allocation as fast as possible, and by doing so, decoding delay with respect to downlink shared channel (DL-SCH), i.e., overall DL transmission delay may be decreased.

Because one PDCCH may deliver one DCI message and a plurality of UEs may be simultaneously scheduled for DL and UL, a plurality of PDCCHs may be simultaneously transmitted in each cell. As a reference signal for decoding the PDCCH 201, a cell-specific reference signal (CRS) 203 is used. The CRS 203 is transmitted for every subframe over a full band, and scrambling and resource mapping varies according to cell identity (ID). Because the CRS 203 is a reference signal commonly used by all UEs, UE-specific beamforming is not used. Therefore, the multi-antenna transmission scheme for PDCCH of LTE is limited to open-loop transmission diversity. The number of ports of the CRS is implicitly notified to the UE from decoding of a physical broadcast channel (PBCH).

The resource allocation of the PDCCH 201 is based on a control-channel element (CCE), and one CCE consists of 9 resource element groups (REGs), i.e., a total of 36 REs. The number of CCEs required for the specific PDCCH 201 may be 1, 2, 4, or 8 and may vary according to a channel coding rate of a DCI message payload. As described above, different numbers of CCEs may be used to implement link adaptation of the PDCCH 201.

The UE has to detect a signal without having information about the PDCCH 201, and in the LTE, a search space representing a set of CCEs is defined for blind decoding. The search space is configured as a plurality of sets at aggregation level (AL) of each CCE and is not explicitly signaled but is implicitly defined via a function and a subframe number according to an ID of the UE. In each subframe, the UE performs decoding on the PDCCH 201 with respect to all available resource candidates that may be generated from CCEs in a configured search space, and processes information declared to be valid to the UE via CRC checking.

The search space is classified to a UE-specific search space and a common search space. UEs in a certain group or all UEs may monitor a common search space of the PDCCH 201 so as to receive cell-common control information such as dynamic scheduling about system information or a paging message. For example, scheduling allocation information of a DL-SCH for transmission of System Information Block (SIB)-1 including business information of a cell may be received by monitor the common search space of the PDCCH 201.

In the LTE, an entire PDCCH region includes a set of CCEs in a logical region, and a search space consisting of a set of CCEs is present. The search space may be classified into a common search space and a UE-specific search space, and a search space for a LTE PDCCH is defined as below.

The set of PDCCH candidates to monitor are defined in terms of search spaces, where a search space $S_k^{(L)}$ at aggregation level $L \in \{1,2,4,8\}$ is defined by a set of PDCCH candidates. For each serving cell on which PDCCH is monitored, the CCEs corresponding to PDCCH candidate m of the search space $S_k^{(L)}$ are given by $L\{(Y_k+m') \bmod \lfloor N_{CCE,k}/L \rfloor\}+i$ (where, Yk is defined below, i=0, ..., L−1.) For the common search space m'=m.

For the PDCCH UE specific search space, for the serving cell on which PDCCH is monitored, if the monitoring UE is configured with carrier indicator field, then $m'=m+M^{(L)} \cdot n_{CI}$, where nCI is the carrier indicator field value, else if the monitoring UE is not configured with carrier indicator field, then m'=m, where m=0, ..., M(L)−1. M(L) is the number of PDCCH candidates to monitor in the given search space.

Note that the carrier indicator field value is the same as ServCellIndex.

For the common search spaces, Yk is set to 0 for the two aggregation levels L=4 and L=8.

For the UE-specific search space $S_k^{(L)}$ at aggregation level L, the variable Yk is defined by $Y_k=(A \cdot Y_{k-1}) \bmod D$ where, Y−1=nRNTI≠0, A=39827, D=65537 and $k=\lfloor n_s/2 \rfloor$, ns is the slot number within a radio frame. The RNTI value used for nRNTI is defined in subclause 7.1 in downlink and subclause 8 in uplink.

According to the definition of a search space for a PDCCH described above, a UE-specific search space is not explicitly signaled but is implicitly defined via a function and a subframe number according to an ID of the UE. In other words, a UE-specific search space may be changed according to a subframe number, which means that it can be changed according to time, and thus, a problem (blocking problem) in which a specific UE among UEs cannot use a search space due to other UEs may be solved.

According to an embodiment, if a specific UE is not scheduled in a corresponding subframe because all CCEs monitored by the specific UE are already used by other UEs scheduled within the same subframe, this problem may not occur in a next subframe as the search space is changed according to time. For example, even when UE-specific search spaces of UE #1 and UE #2 partially overlap each other in a specific subframe, it may be expected that an overlap in a next subframe may be different from the above overlap because the UE-specific search space is changed for each subframe.

According to the definition of a search space for a PDCCH described above, a common search space is defined as a set of previously appointed CCEs because a certain group of UEs or all UEs have to receive the PDCCH. In other words, the common search space is not changed according to the ID of the UE or the subframe number. Although the common search space is present for transmission of various system messages, the common search space may also be used to transmit control information for individual UEs. By doing so, the common search space may be even used as a solution for a problem in which a UE cannot be scheduled due to shortage of available resources in a UE-specific search space.

A search space may correspond to a set of candidate control channels composed of CCEs for which the UE has to attempt to decode on a given aggregation level, and because there are various aggregation levels at which 1, 2, 4 or 8 CCEs constitute one set, the UE has a plurality of search spaces. In LTE PDCCH, the number of PDCCH candidates to be monitored by the UE in a search space defined according to aggregation levels is defined in Table below.

TABLE 1

| | Search space $S_K^{(L)}$ | | |
|---|---|---|---|
| Type | Aggregation level $L$ | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

According to Table 1, in a UE-specific search space, aggregation levels {1, 2, 4, 8} are supported and have {6, 6, 2, 2} PDCCH candidates, respectively. In a common search space, aggregation levels {4, 8} are supported and have {4, 2} PDCCH candidates, respectively. The reason why the common search space supports only aggregation levels {4, 8} is to improve a coverage feature because, in general, a system message has to reach a cell boundary.

DCI transmitted in a common search space is defined only for a particular DCI format such as 0/1A/3/3A/1C that correspond to purposes including a system message or a power control with respect to a group of UEs. The common search space does not support a DCI format having spatial multiplexing. A DL DCI format to be decoded in a UE-specific search space varies according to a transmission mode configured for a certain UE. Configuration of the transmission mode is performed by radio resource control (RRC) signaling, such that an exact subframe number is not defined with respect to whether the configuration is effective for the certain UE. Therefore, regardless of the transmission mode, the certain UE may constantly perform decoding on DCI format 1A so as not to lose communication.

In the above, a method of transmitting and receiving a DL control channel and DL control information and search spaces in the legacy LTE and LTE-A are described.

Hereinafter, a DL control channel under discussion in the 5G communication system will now be described in detail with reference to drawings.

Figure 3:
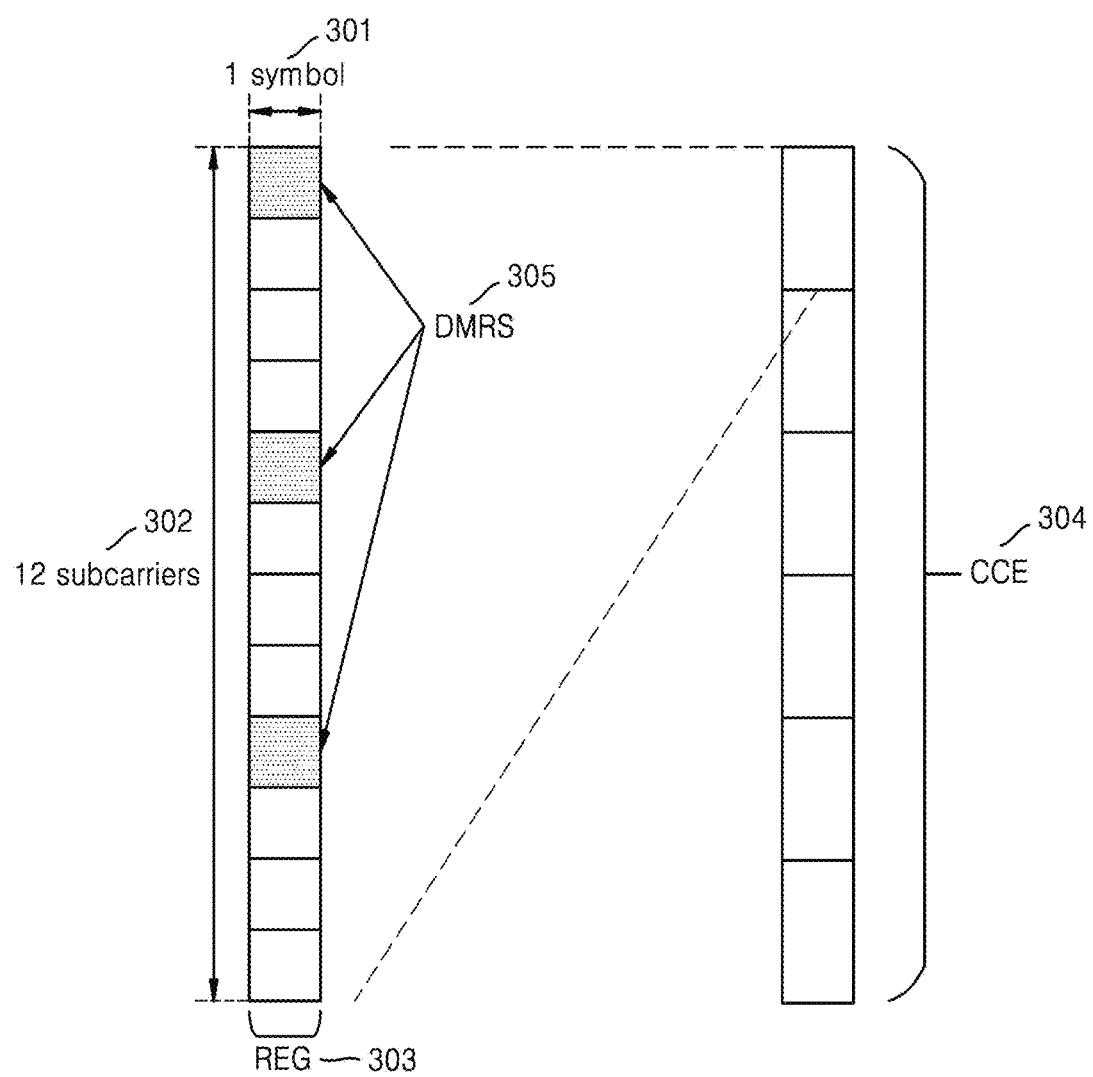
FIG. 3 is a diagram illustrating an example of a basic unit of time and frequency resources configuring a DL control channel in 5th-generation (5G).

FIG. 3 is a diagram illustrating an example of a basic unit of time and frequency resources configuring a DL control channel in the 5G.

Referring to FIG. 3, an REG 303 that is a basic unit of time and frequency resources configuring a control channel consists of one OFDM symbol 301 on the time axis and 12 subcarriers 302, i.e., one RB, on the frequency axis. When configuring a basic unit of a control channel, a basic unit on the time axis is assumed to be one OFDM symbol 301, such that a data channel and a control channel may be time-multiplexed within one subframe. Because the control channel is positioned before the data channel, a processing time of a UE may be decreased such that it is easy to satisfy delay time requirements. A basic unit on the frequency axis of the control channel is configured to be one RB 302, such that frequency multiplexing between the control channel and the data channel may be further efficiently performed.

By concatenating the REG 303 shown in FIG. 3 with another REG, control channel regions with various sizes may be configured. For example, in a case where a basic unit to which a DL control channel is allocated is a CCE 304, one CCE 304 may consist of a plurality of REGs 303. Describing the REG 303 shown in FIG. 3, the REG 303 may consist of 12 REs, and if one CCE 304 consists of 6 REGs 303, this means that one CCE 304 may consist of 72 REs. When a DL control resource set is configured, the control resource set may consist of a plurality of CCEs 304, and a particular DL control channel may be mapped to one or more CCEs 304 according to an aggregation level (AL) in the control resource set and transmitted. The CCEs 304 in the control resource set are identified by numbers, and in this regard, the numbers may be allocated according to a logical mapping scheme.

The basic unit of the DL control channel shown in FIG. 3, i.e., the REG 303, may include REs to which DCI is mapped and REs to which a demodulation reference signal (DMRS) 305 that is a reference signal for decoding them are mapped. As shown in FIG. 3, the DMRS 305 may be transmitted in three REs in one REG 303. The DMRS 305 is transmitted by using the same precoding as a control signal mapped in the REG 303, and thus, the UE is able to decode control information without information about precoding being applied by a BS.

Figure 4:
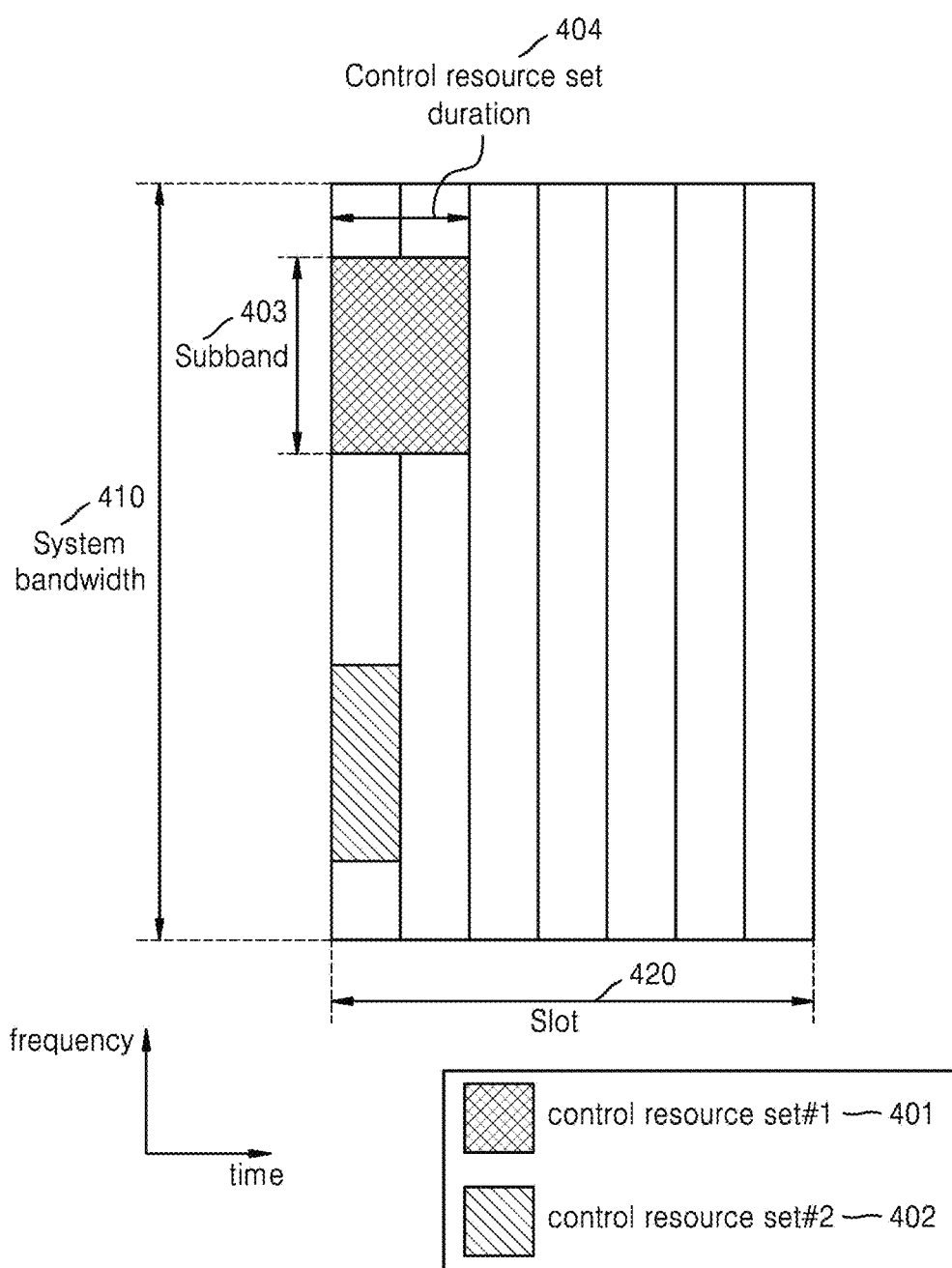
FIG. 4 is a diagram illustrating an example of a control resource set (CORESET) in which a DL control channel is transmitted in a 5G wireless communication system.

FIG. 4 is a diagram illustrating an example of a control resource set (CORESET) in which a DL control channel is transmitted in the 5G wireless communication system.

An example of FIG. 4 corresponds to a case in which it is assumed that one slot consists of 7 OFDM symbols. FIG. 4 illustrates the example in which two control resource sets (control resource set #1 401 and control resource set #2 402) are configured in a system bandwidth 410 on the frequency axis and one slot 420 on time axis. A frequency of control resource sets 401 and 402 may be configured as a particular subband 403 within the full system bandwidth 410. Time duration of the control resource sets 401 and 402 may be configured as one or more OFDM symbols, and may also be defined as control resource set duration 404. In the example of FIG. 4, control resource set #1 401 is configured as control resource set duration of two symbols, and control resource set #2 402 is configured as control resource set duration of one symbol.

The control resource set in the 5G described above may be configured by the BS for the UE by higher layer signaling (e.g., system information, master information block (MIB), or RRC signaling). Configuring the UE with a control resource set may be understood as providing the UE with information such as a position of the control resource set, a subband, resource allocation of the control resource set, control resource set duration, or the like. For example, the information may include a plurality of pieces of information of Table 2.

TABLE 2

- Configuration information 1. RB allocation information on frequency axis
- Configuration information 2. control resource set start symbol
- Configuration information 3. control resource set symbol duration
- Configuration information 4. Size of REG bundling (2 or 3 or 6)
- Configuration information 5. Transmission mode (interleaved transmission mode or non-interleaved transmission mode)
- Configuration information 6. DMRS configuration information (precoder granularity)
- Configuration information 7. Search space type (common search space, group-common search space, UE-specific search space)
- Configuration information 8. DCI format to be monitored in corresponding control resource set
- etc.

The configuration information of Table 2 is merely an example of the disclosure, and various information as well as the configuration information of Table 2 necessary for transmission of a DL control channel may be configured for the UE.

Hereinafter, DCI in the 5G will now be described in detail.

In the 5G system, scheduling information for UL data (or physical uplink shared channel (PUSCH)) or DL data (or PDSCH) is transmitted from the BS to the UE via the DCI.

The UE may monitor a fallback DCI format and a non-fallback DCI format for PUSCH or PDSCH. The fallback DCI format may include a field fixed between the BS and the UE, and the non-fallback DCI format may include a configurable field.

According to an embodiment of the disclosure, fallback DCI for scheduling PUSCH may include a plurality of pieces of information of Table 3.

TABLE 3

| | |
|---|---|
| - | Identifier for DCI formats - [1] bit |
| - | Frequency domain resource assignment $[\lceil \log_2(N_{RB}^{DL, BWP} (N_{RB}^{DL, BWP} + 1)/2)\rceil]$ bits |
| - | Time, domain resource assignment - X bits |
| - | Frequency hopping flag - 1 bit. |
| - | Modulation and coding scheme - [5] bits |
| - | New data indicator - 1 bit |
| - | Redundancy version - [2] bits |
| - | HARQ process number - [4] bits |
| - | TPC command for scheduled PUSCH - [2] bits |
| - | UL/SUL indicator - 0 or 1 bit |

According to an embodiment of the disclosure, non-fallback DCI for scheduling PUSCH may include a plurality of pieces of information of Table 4.

TABLE 4

Carrier indicator - 0 or 3 bits
Identifier for DCI formats - [1] bits
Bandwidth part indicator - 0, 1 or 2 bits
Frequency domain resource assignment
    For resource allocation type 0, $\lceil N_{RB}^{UL,BWP}/P \rceil$ bits
    For resource allocation type 1, $\lceil \log_2(N_{RB}^{UL,BWP}(N_{RB}^{UL,BWP} + 1)/2)\rceil$ bits
Time domain resource assignment - 1, 2, 3, or 4 bits
VRB-to-PRB mapping - 0 or 1 bit, only for resource allocation type TABLE 4-continued 1.
    0 bit if only resource allocation type 0 is configured;
    1 bit otherwise.
Frequency hopping flag - 0 or 1 bit, only for resource allocation
type 1.
    0 bit if only resource allocation type 0 is configured;
    1 bit otherwise,
Modulation and coding scheme - 5 bits
New data indicator - 1 bit
Redundancy version - 2 bits as defined in section x.x of [6,
TS38, 214]
    HARQ process number - 4 bits
    1st downlink assignment index - 1 or 2 bits
        1 bit for semi-static HARQ-ACK codebook;
        2 bits for dynamic HARQ-ACK codebook with single HARQ-ACK codebook.
    2nd downlink assignment index 0 or 2 bits
        2 bits for dynamic HARQ-ACK codebook with two HARQ-ACK sub-
        codebooks ;
        0 bit otherwise.
TPC command for scheduled PUSCH - 2 bits SRS resource indicator - $\left\lceil \log_2\left(\sum_{k=1}^{L_{max}} \binom{N_{SRS}}{k}\right)\right\rceil$ or $\lceil \log_2(N_{SRS}) \rceil$ bits $\left\lceil \log_2\left(\sum_{k=1}^{L_{max}} \binom{N_{SRS}}{k}\right)\right\rceil$ bits for non-codebook based PUSCH transmission;

$\lceil \log_2(N_{SRS}) \rceil$ bits for codebook based PUSCH transmission.
Precoding information and number of layers - up to 6 bits
Antenna ports - up to 5 bits
SRS request - 2 bits
CSI request - 0, 1, 2, 3, 4, 5, or 6 bits
CBG transmission information - 0, 2, 4, 6, or 8 bits
PTRS-DMRS association 2 bits.
beta_offset indicator - 2 bits
DMRS sequence initialization - 0 or 1 bit
UL/SUL indicator - 0 or 1 bit According to an embodiment of the disclosure, fallback DCI for scheduling PDSCH may include a plurality of pieces of information of Table 5.

TABLE 5

- Identifier for DCI formats - [1] bit
- Frequency domain resource assignment
$\lceil \log_2(N_{RB}^{DL, BWP}(N_{RB}^{DL, BWP} + 1)/2) \rceil$ bits
- Time domain resource assignment - X bits
- VRB-to-PRB mapping - 1 bit.
- Modulation and coding scheme - [5] bits
- New data indicator - 1 bit
- Redundancy version - [2] bits
- HARQ process number - [4] bits
- Downlink assignment index - 2 bits
- TPC command for scheduled PUCCH - [2] bits
- PUCCH resource indicator - [2] bits
- PDSCH-to-HARQ feedback timing indicator - [3] bits According to an embodiment of the disclosure, non-fallback DCI for scheduling PDSCH may include a plurality of pieces of information of Table 6.

TABLE 6

- Carrier indicator - 0 or 3 bits
- Identifier for DCI formats - [1] bits
- Bandwidth part indicator - 0, 1 or 2 bits
- Frequency domain resource assignment
  • For resource allocation type 0, $\lceil N_{RB}^{DL, BWP} / P \rceil$ bits
  • For resource allocation type 1,
    $\lceil \log_2(N_{RB}^{DL, BWP}(N_{RB}^{DL, BWP} + 1)/2) \rceil$ bits
- Time domain resource assignment - 1, 2, 3, or 4 bits
- VRB-to-PRB mapping - 0 or 1 bit, only for resource allocation TABLE 6-continued type 1.
  •   0 bit if only resource allocation type 0 is configured;
  •   1 bit otherwise.
- PRB bundling size indicator - 1 bit
- Rate matching indicator - 0, 1, 2 bits
- ZP CSI-RS trigger - X bits
For transport block 1:
- Modulation and coding scheme - 5 bits
- New data indicator - 1 bit
- Redundancy version - 2 bits
For transport block 2:
- Modulation and coding scheme - 5 bits
- New data indicator - 1 bit
- Redundancy version - 2 bits
- HARQ process number - 4 bits
- Downlink assignment index - 0 or 4 bits
- TPC command for scheduled PUCCH - 2 bits
- PUCCH resource indicator
- PDSCH-to-HARQ_feedback timing indicator - 3 bits
- Antenna ports - up to 5 bits
- Transmission configuration indication - 3 bits
- SRS request - 2 bits
- CBG transmission information - 0, 2, 4, 6, or 8 bits
- CBG flushing out information - 0 or 1 bit
- DMRS sequence initialization - 0 or 1 bit The DCI may be transmitted via a PDCCH, which is a DL physical control channel, after a channel coding and modulation procedure. A CRC may be attached to a DCI message payload, and may be scrambled by a RNTI that corresponds to an ID of the UE.

Different RNTIs are used according to the purpose of the DCI message, e.g., UE-specific data transmission, a power control command, a random access response, or the like.

That is, the RNTI is not explicitly transmitted, but is transmitted by being included in a CRC calculation process. When the UE receives a DCI message transmitted on a PDCCH, the UE may check a CRC by using an allocated RNTI. When a result of checking the CRC is correct, the UE may identify that the corresponding message has been transmitted to the UE.

For example, DCI that schedules a PDSCH for system information (SI) may be scrambled by SI-RNTI. DCI that schedules a PDSCH for a random access response (RAR) message may be scrambled by an RA-RNTI. DCI that schedules a PDSCH for a paging message may be scrambled by a P-RNTI. DCI that notifies a slot format indicator (SFI) may be scrambled by an SFI-RNTI. DCI that notifies a transmit power control (TPC) may be scrambled by a TPC-RNTI. DCI that schedules UE-specific PDSCH or PUSCH may be scrambled by a Cell RNTI (C-RNTI).

When a specific UE is scheduled a data channel, i.e., PUSCH or PDSCH, via the PDCCH, a plurality of items of data along with a DMRS are transmitted or received within a scheduled resource region.

Figure 5:
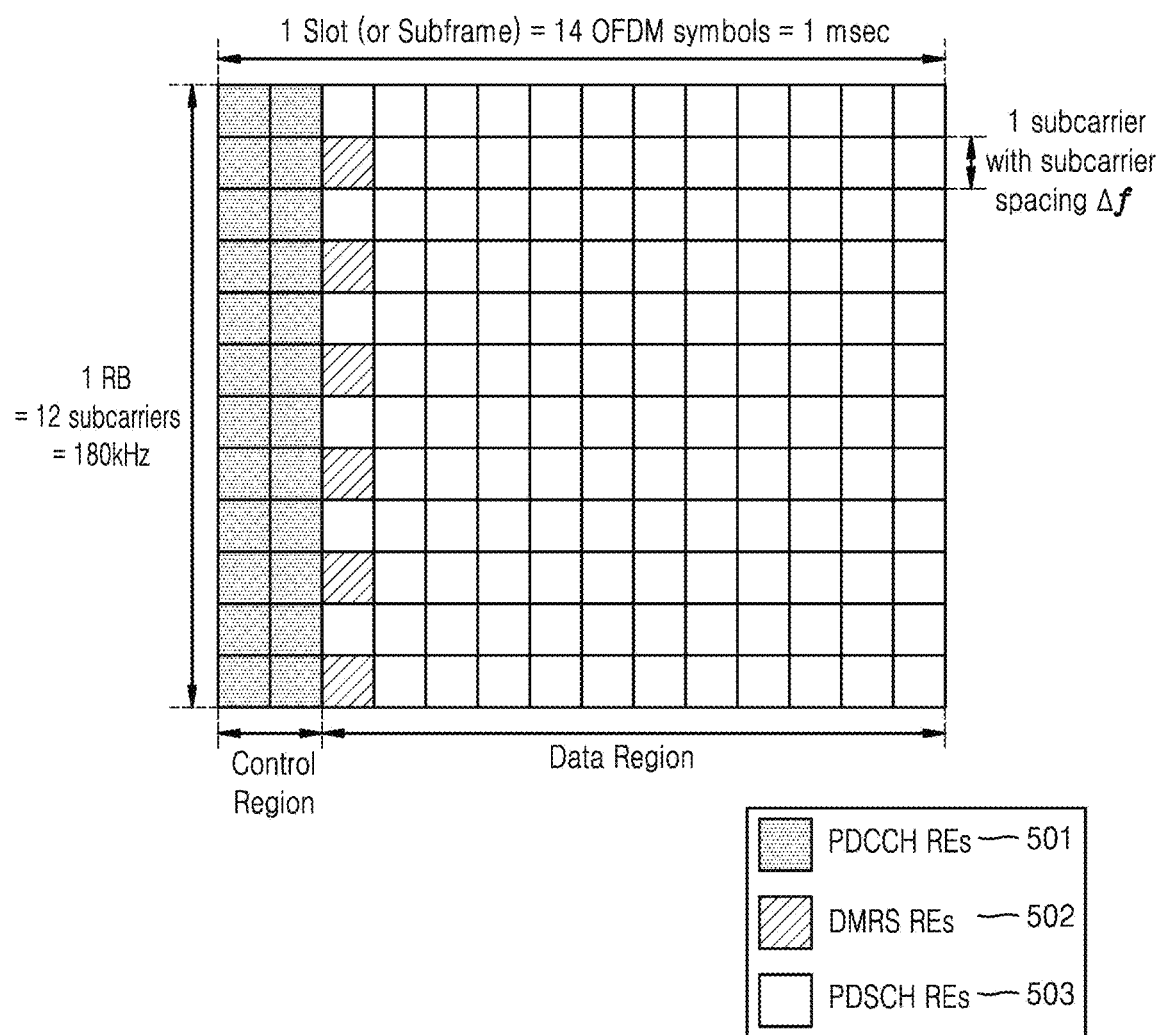
FIG. 5 is a diagram illustrating an example of configuration of a DL resource block (RB) structure in the 5G.

FIG. 5 is a diagram illustrating an example of configuration of a DL RB structure in the 5G.

More particularly, FIG. 5 illustrates a case in which it is configured that a specific UE uses 14 OFDM symbols as one slot (or subframe) in a DL, a PDCCH is transmitted on initial two OFDM symbols, and a DMRS is transmitted on a third symbol. In the case of FIG. 5, in a specific RB to which a PDSCH is scheduled, data of the PDSCH is mapped to REs of the third symbol on which the DMRS is not transmitted and REs of fourth symbol up to last symbol and is transmitted. A subcarrier spacing $\Delta f$ represented in FIG. 5 is 15 kHz in the LTE/LTE-A system and is one of {15, 30, 60, 120, 240, 480} kHz in the 5G system.

As described above, in order to measure a DL channel state in a cellular system, a BS needs to transmit a reference signal. In the LTE-A system of the 3GPP, a UE can measure a channel state between the BS and the UE by using a CRS or a channel-state information reference signal (CSI-RS) which is transmitted by the BS.

The channel state has to be measured, in consideration of various factors including an interference amount in a DL. The interference amount in the DL includes an interference signal and thermal noise occurring due to an antenna of a neighboring BS, and is important for the UE to determine a channel condition of the DL. For example, in a case where a BS with one transmission antenna transmits a signal to a UE with one reception antenna, the UE has to determine energy per symbol to interference density ratio (Es/Io) by determining energy per symbol receivable via a DL from a reference signal received from the BS and an interference amount to be simultaneously received from duration where a corresponding symbol is received. The determined Es/Io may be converted to a data rate or a value corresponding thereto and be transmitted in the form of a channel quality indicator (CQI) to the BS, and may be used for the BS to determine a data rate for transmitting data to the UE.

More particularly, in the LTE-A system, the UE feeds back information about a DL channel state to the BS, such that the BS can use the information in DL scheduling. That is, the UE measures a reference signal transmitted via a DL by the BS, and feeds back, to the BS, information that is extracted from the reference signal and is in the form defined in the LTE/LTE-A standard. As described above, the information fed back by the UE in the LTE/LTE-A may be called channel-state information, and the channel-state information may include three pieces of information below.

Rank Indicator (RI): The number of spatial layers the UE can receive in a current channel state Precoding Matrix Indicator (PMI): An indicator of precoding matrix preferred by the UE in a current channel state Channel Quality Indicator (CQI): A maximum data rate the UE can receive in a current channel state The CQI may be substituted with a signal to interference plus noise ratio (SINR), a maximum error correction code rate, a modulation scheme, data efficiency per frequency, or the like which may be similarly used with the maximum data rate.

RI, PMI, and CQI described above are associated with each other as an indication. For example, a precoding matrix supported in the LTE/LTE-A is differently defined according to ranks. Therefore, a PMI value X of a case where RI has a value of 1 may be differently interpreted from the PMI value X of a case where RI has a value of 2.

Also, for example, when the UE determines a CQI, the UE assumes that a PMI value X notified to the BS by the UE is applied to the BS. That is, a report of RI_X, PMI_Y, CQI_Z reported from the UE to the BS may correspond to a report in which the UE reports that the UE can receive a data rate corresponding to CQI_Z when a rank is RI_X and PMI is PMI_Y. In this manner, when the UE calculates a CQI, the UE assumes a transmission scheme by the BS, thereby obtaining optimized performance when transmission is actually performed by using the transmission scheme.

RI, PMI, and CQI that are channel state information the UE feeds back in the LTE/LTE-A may be periodically or aperiodically fed back. When the BS attempts to aperiodically obtain channel state information of the UE, the BS may configure the UE to perform aperiodic feedback (or aperiodic channel state information reporting), by using an aperiodic feedback indicator (or channel state information request field, channel state information request information) included in DCI for the UE. Also, when the UE receives, in an nth subframe, an indicator configuring aperiodic feedback, the UE may perform UL transmission by including aperiodic feedback information (or, channel state information) in data transmission in an n+kth subframe. Here, k denotes a parameter defined in the 3GPP LTE Release 11 standard, and may be 4 for frequency division duplexing (FDD) and may be defined, for time division duplexing (TDD), as in Table 7 below.

TABLE 7

Value of k for each subframe number n in TDD UL/DL configuration

When aperiodic feedback is configured, feedback information (or, channel state information) may include RI, PMI, and CQI and, depending on feedback configuration (or channel state report configuration), RI and PMI may not be fed back.

In the disclosure, an in-band full duplex (hereinafter, referred to as full duplex) system refers to a system a UL signal and a DL signal of a same cell are simultaneously transmitted in a same band and in a same time resource, unlike to a TDD system or FDD system. That is, in the full duplex system, signals of UL and DL coexist in a same cell, which causes interference.

A type of interference additionally occurring due to usage of the full duplex system is classified into self-interference and cross-link interference.

The self-interference refers to interference received from DL transmission by the BS when the BS receives UL transmission by the UE in a same band, and interference received from UL transmission by the UE when the UE with a full duplex operation function receives a DL. Because transmission and reception occur in a short range, compared to a desired signal, the self-interference significantly decreases an SINR of the desired signal. Therefore, transmission performance of the full duplex system is highly affected by performance of a self-interference cancellation technology.

The cross-link interference refers to interference received from DL transmission by another BS in a same band when the BS receives a UL of the UE, and interference received from UL transmission by another UE when the UE receives a DL. In a case of cross-link interference the BS that receives a UL signal receives from DL transmission by another BS, a distance between an interference transmission end and an interference reception end is greater than a distance between a reception end of the BS and the UE that transmits a requested signal of the BS, however, as interference transmission power is generally greater than a reception power by at least 10 to 20 dB, the cross-link interference may highly affect reception SINR performance of a UL desired signal of the UE which is received by the BS. Also, the UE that receives a DL may receive cross-link interference from another UE that uses a UL in a same band. Here, in a case where a distance between the other UE causing interference and the UE receiving a DL is meaningfully closer than a distance between the BS and the UE receiving a DL, DL desired signal reception SINR performance of the UE may deteriorate. Here, the meaningfully closer case indicates a state in which reception power of interference from the other UE transmitting UL to the UE receiving a DL is larger than or similar to a reception signal from the BS to the UE receiving a DL, and thus, DL reception SINR performance of the UE may deteriorate due to the interference.

A type of the full duplex system in a cellular-based mobile communication system is classified into a type in which only a BS supports self-interference cancellation to support a full duplex operation and a type in which both the BS and a UE support the full duplex operation. The reason why a case where only the UE has self-interference cancellation is not considered is that implementation of elements of antennas-separation self-interference cancellation, radio frequency (RF)-circuit self-interference cancellation, and digital self-interference cancellation is easier in the BS than in the UE, in terms of a form factor size, a circuit structure, and the like.

A type of the full duplex system which is considered for the disclosure is a case where only the BS has self-interference cancellation, but the disclosure may operate by being equally applied to a case where both the UE and the BS have self-interference cancellation.

Figure 6:
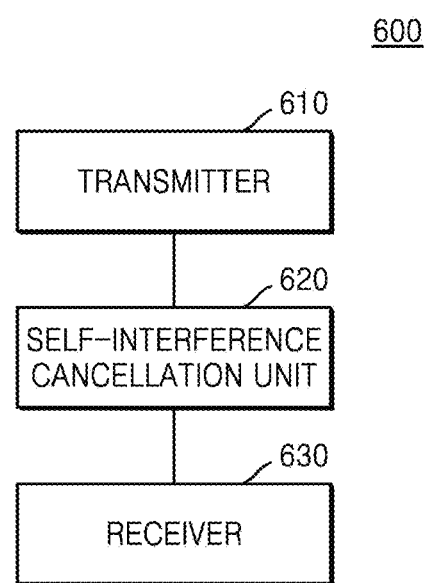
FIG. 6 is a configuration diagram of a transceiving apparatus with self-interference cancellation that is a main element of a full duplex system according to an embodiment of the disclosure.

FIG. 6 is a configuration diagram of a transceiving apparatus with self-interference cancellation that is a main element of a full duplex system according to an embodiment of the disclosure.

Here, a structure of a transceiving apparatus 600 is equally applicable to a BS and a UE, and is not specified for only one of the BS and the UE. However, as it is assumed in the disclosure that the BS has self-interference cancellation and configures the full duplex system, for convenience of descriptions, it is assumed that the transceiving apparatus 600 is the BS.

Referring to FIG. 6, the BS 600 may include a transmitter 610 for transmitting a DL signal to a UE, a self-interference cancellation unit 620 for self-interference cancellation, and a receiver 630 for receiving a UL signal from the UE. Here, a configuration method of each element of the BS 600 may vary depending on implementation of a BS.

As described above, the transceiving apparatus 600 may correspond to a UE, and in this case, the UE may also include the transmitter 610 for transmitting a UL signal to a BS, the self-interference cancellation unit 620 for self-interference cancellation, and the receiver 630 for receiving a DL signal from the BS.

Figure 7A:
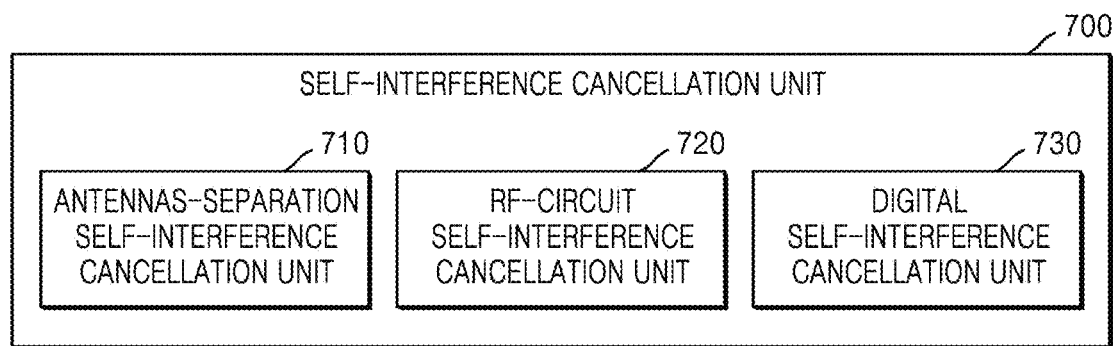
FIGS. 7A and 7B are configuration diagrams of a self-interference cancellation unit according to an embodiment of the disclosure.

FIG. 7A is a configuration diagram of a self-interference cancellation unit according to an embodiment of the disclosure.

As described above, a self-interference cancellation unit 700 may perform self-interference cancellation. The self-interference cancellation unit 700 of FIG. 7A may include an antennas-separation self-interference cancellation unit 710, an RF-circuit self-interference cancellation unit 720, and a digital self-interference cancellation unit 730, but a configuration of the self-interference cancellation unit 700 is not limited to the aforementioned example.

Figure 7B:
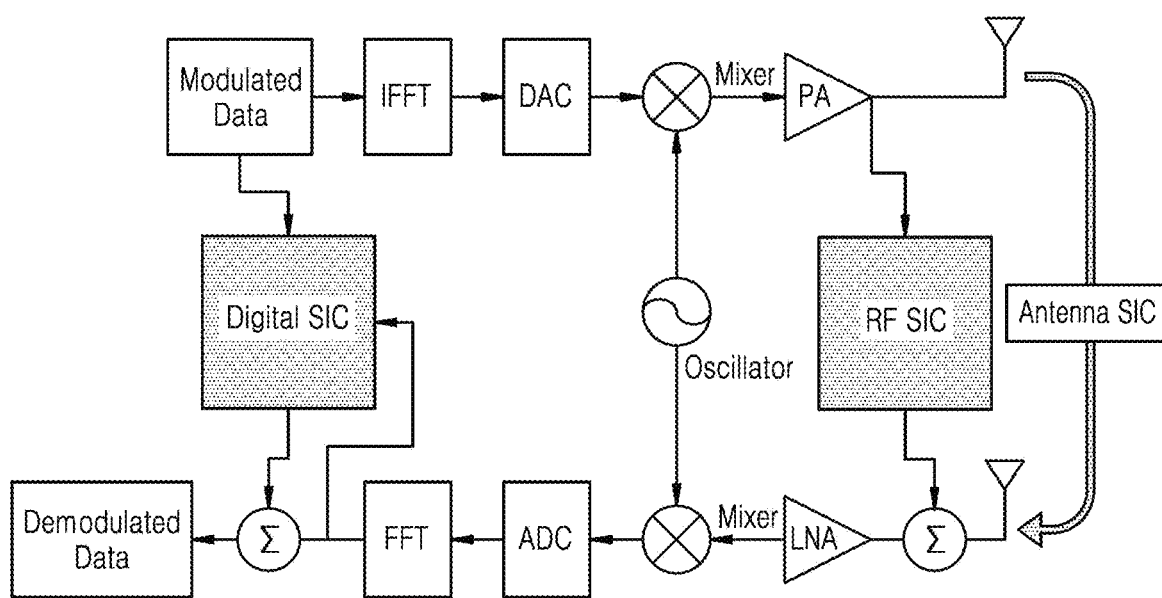

Also, FIG. 7B is a block diagram of a full duplex transceiver, according to an embodiment of the disclosure. Antenna SIC of FIG. 7B may correspond to the antennas-separation self-interference cancellation unit 710 of the disclosure, RF SIC may correspond to the RF-circuit self-interference cancellation unit 720, and Digital SIC may correspond to the digital self-interference cancellation unit 730.

The antennas-separation self-interference cancellation unit 710 physically separates antennas of a transmission end and a reception end of a BS, thereby allowing self-interference to be sufficiently decreased and then received by the reception end of the BS. Here, the physical separation of the antenna of the transmission end and the antenna of the reception end may indicate that the antennas are separated by using a separating method using offset interference of antennas, a method of using a circulator to a same antenna, a method using a cross-pole structure, a method using an isolator, or the like so as to allow a DL transmission signal of the BS to be received as a low signal by a UL reception end of the BS. However, the physical separation is not limited to the afore-described example, and may indicate separating methods by which a DL transmission signal of a BS can be received as a low signal by a UL reception end of the BS.

The RF-circuit self-interference cancellation unit 720 may be configured to decrease a magnitude of a signal before a self-interference signal is quantized by an analog-to-digital converter (ADC). An RF-circuit of the RF-circuit self-interference cancellation unit 720 may duplicate a channel experienced by a self-interference signal that is transmitted from a transmission end of the BS and then passes through a radio channel and the antennas-separation self-interference cancellation unit 710 and then arrives at the RF-circuit self-interference cancellation unit 720.

For example, with respect to an analog domain transmission signal x(t) of the BS, a reception signal y(t) that has passed through the antennas-separation self-interference cancellation unit 710 and the radio channel may be represented using Equation 1 below.

$$y(t)=x(t)*h(t)+n(t) \qquad \text{[Equation 1]}$$

In Equation above, h(t) denotes a time domain impulse response of the radio channel and the antennas-separation self-interference cancellation unit 710, and n(t) denotes white noise. Here, the RF-circuit of the RF-circuit self-interference cancellation unit 720 may generate a similar channel h'(t), which is duplication of h(t), by using a time delay module, a phase shift module, an amplifier module, and the like. Afterward, the transmission signal x(t) obtainable from the transmission end passes through the RF-circuit, such that a self-interference signal is duplicated. Afterward, a minus sign is added to the self-interference signal, which causes a decrease in the self-interference signal as a result of Equation 2 below.

$$y'(t)=x(t)*h(t)-x(t)*h'(t)+n(t) \quad \text{[Equation 2]}$$

Here, a bandwidth in which performance of the RF-circuit self-interference cancellation unit 720 is maintained may vary depending on the elements of the RF-circuit, e.g., the time delay module, the phase shift module, the amplifier module, and the like. For example, in a case where the bandwidth in which performance of the RF-circuit self-interference cancellation unit 720 is maintained is smaller than a system bandwidth, such a bandwidth limit of a self-interference cancellation unit is caused due to a limit of an analog circuit.

Lastly, the digital self-interference cancellation unit 730 may remove a self-interference signal X[n] from Y[n] that is a result of a signal y'(t) having passed through the RF-circuit self-interference cancellation unit 720 and then having passed through the ADC and then having been converted into a frequency domain. For example, a digital domain channel H[n] experienced by a transmission signal X[n] is estimated as in Equation 3 below, and then is subtracted from a reception signal Y[n]. Here, performance of the digital self-interference cancellation unit is determined by similarity between an estimated channel H'[n] and the actual channel H[n]. That is, the higher the similarity between H'[n] and H[n] is, the higher the performance of the digital self-interference cancellation unit is.

$$Y'[n]=X[n]H[n]-X[n]H'[n]+n(t) \quad \text{[Equation 3]}$$

Hereinafter, embodiments of the disclosure will now be described in detail with reference to the attached drawings.

Hereinafter, embodiments of the disclosure will now be described with LTE or LTE-A system as an example, but the embodiments of the disclosure may also be applied to other communication systems having similar technical backgrounds or channel types. For example, a communication system to which the embodiments of the disclosure are applied may include a 5G mobile communication technology (NR) developed after the LTE-A. Therefore, the embodiments of the disclosure may also be applied to other communication systems through partial modification without greatly departing from the scope of the disclosure based on determination by one of ordinary skill in the art.

Also, in the description of the disclosure, detailed descriptions of the related art are omitted when it is deemed that they may unnecessarily obscure the essence of the disclosure. The terms used in the specification are defined in consideration of functions used in the disclosure, and can be changed according to the intent or commonly used methods of users or operators. Accordingly, definitions of the terms are understood based on the entire description of the present specification.

Figure 8:
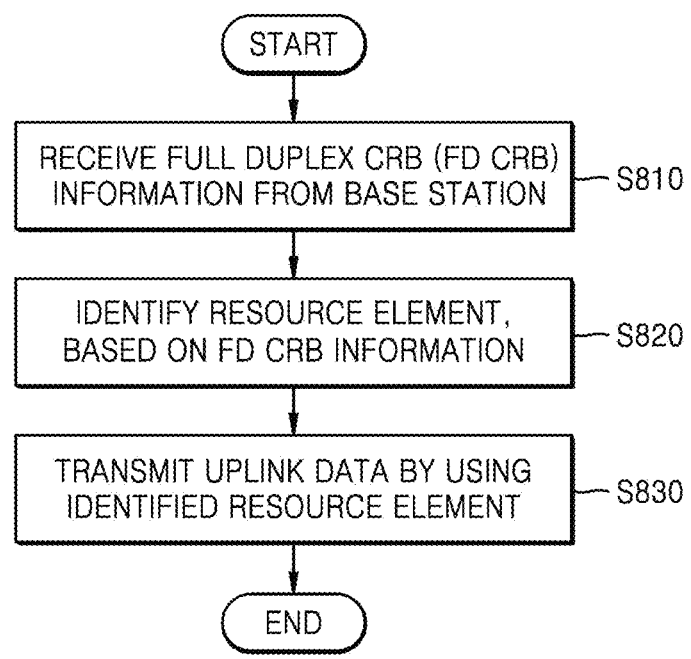
FIG. 8 is a flowchart of a method by which a user equipment (UE) transmits and receives a signal in a wireless communication system according to an embodiment of the disclosure.

FIG. 8 is a flowchart of a method by which a UE transmits and receives a signal in a wireless communication system according to an embodiment of the disclosure.

In operation S810, the UE may receive full duplex carrier resource block (FD CRB) information from a BS.

In the disclosure, an FD CRB may indicate a band in which the BS can receive an UL signal, from among CRBs obtained by dividing a band usable by the BS into certain units. Also, the FD CRB may indicate a band in which the UE can transmit an UL signal, from among CRBs obtained by dividing a band usable by the UE into certain units. Here, the FD CRB may indicate a band in which the BS can transmit a DL signal. However, the FD CRB merely indicates a band in which the UE can transmit an UL signal, from among CRBs obtained by dividing a band in which the BS can receive a UL signal or a band that is usable by the UE into certain units, and thus, it is not limited that the BS transmits a DL signal by using the FD CRB.

Also, in the disclosure, the FD CRB may correspond to a full duplex resource block (FD RB). Detailed descriptions of the FD CRB will be provided with reference to FIG. 10.

In the disclosure, the FD CRB information may be information associated with the FD CRB to be described below. That is, the FD CRB information may include information about CRBs configured as the FD CRB, information about indices indicating the CRBs configured as the FD CRB, or the like. Also, the FD CRB information may correspond to an FD CRB set list to be described below. Also, the FD CRB information may include an FD CRB set list or information about an FD CRB set to be described below. Descriptions of the FD CRB set list and the FD CRB set will be provided with reference to FIGS. 11A and 11B of the disclosure.

Also, the FD CRB information may include only information about FD CRBs corresponding to one index. Also, as another example, the FD CRB information may include a plurality of pieces of information about FD CRBs respectively indicated by indices. According to an embodiment of the disclosure, the UE may receive the FD CRB information by RRC signaling or DCI including the FD CRB information.

First, in legacy DCI, a value of a bit that allocates PUSCH scheduling is defined according to resource allocation type 0 or 1, as in Equation below.

$$\text{For resource allocation type } 0, \lceil N_{RB}^{UL,BWP}/P \rceil \text{ bits}$$

$$\text{For resource allocation type } 1, \lceil \log_2(N_{RB}^{UL,BWP}(N_{RB}^{UL,BWP}+1)/2) \rceil \text{ bits} \quad \text{[Equation 4]}$$

According to an embodiment of the disclosure, when the UE receives the FD CRB information (or FD CRB set list in the disclosure) via DCI, a value of a bit in DCI which allocates PUSCH scheduling may be changed according to a bandwidth usable by the UE. More particularly, when the FD CRB information is changed according to configuration by the BS or FD CRB configuration condition, a maximum number of CRBs may be changed.

Here, $N_{RB}^{UL,BWP}$ that is a value corresponding to a parameter where a bit is allocated in DCI may be defined as $N_{FD\_CRB}^{UL,BWP}$ according to an embodiment of the disclosure, as Equation below.

$$\text{For resource allocation type } 0, \lceil N_{FD\_CRB}^{UL,BWP}/P \rceil \text{ bits}$$

$$\text{For resource allocation type } 1, \lceil \log_2(N_{FD\_CRB}^{UL,BWP}(N_{FD\_CRB}^{UL,BWP}+1)/2) \rceil \text{ bits} \quad \text{[Equation 5]}$$

Here, $N_{FD\_CRB}^{UL,BWP}$ may indicate a maximum number of FD CRBs the UE can be scheduled in a bandwidth part (BWP) or a maximum number of CRBs at the time of scheduling.

In operation S820, the UE may identify an RE usable for UL data transmission, based on the FD CRB information.

According to an embodiment of the disclosure, the FD CRB information may be indicated by an index corresponding to an FD CRB configuration condition. The FD CRB configuration condition may be information about conditions for configuring the FD CRB information, and may include configuration information of the BS, environment information, and the like which are considered when the FD CRB is configured or determined.

The FD CRB configuration condition may include factors that can change a self-interference channel, the factors including transmission power, the number of ports, a combination of ports, a form of a transmission beam of the BS, precoding, or the like. Here, the FD CRB configuration condition may indicate one configuration factor or may indicate a combination of one or more configuration factors. Here, the FD CRB configuration condition may include, but is not limited to, at least one of the number of ports, a port type, or transmission power. Detailed descriptions of the FD CRB configuration condition will be provided below with reference to FIG. 14.

In operation S830, the UE may transmit UL data by using the identified RE.

According to an embodiment of the disclosure, a resource region usable by the UE may be changed according to a change in a filter, beam switching, or the like. A resource region of the UE which is changed according to the changed configuration may be applied to UL scheduling for the UE. Also, the UE may identify an RB number allocated as a UL resource according to the UL scheduling.

According to an embodiment of the disclosure, the UE may identify an FD CRB set from the FD CRB information. Also, the UE may determine a virtual resource block (VRB) number with respect to each FD CRB included in the FD CRB set, based on a resource allocation possibility. Afterward, the UE may identify a CRB as an RE, the CRB having a VRB number for an FD CRB corresponding to an RB number allocated for the UE as a UL resource.

According to an embodiment of the disclosure, the UE may identify the FD CRB set from the FD CRB information, and may sequentially determine, based on a CRB order, VRB numbers for respective FD CRBs included in the FD CRB set. Also, the UE may identify a CRB as the RE, the CRB having a VRB number for an FD CRB corresponding to an RB number allocated for the UE as a UL resource.

According to an embodiment of the disclosure, the UE may identify the FD CRB set from the FD CRB information, and may identify an RB as an RE, the RB overlapping in the FD CRB set and a UL PDSCH RB region allocated by a resource indication value (RIV).

Also, the UE may receive CSI-RS from the BS.

According to an embodiment of the disclosure, the UE may receive the CSI-RS by using the identified RE. Here, the UE may receive the CSI-RS from the BS, based on preset transmission power for the CSI-RS. Also, as the transmission power for the RE identified based on the FD CRB information is adjusted, the UE may adjust transmission power for a PDSCH among the CSI-RS and the PDSCH which are received via the identified RE.

According to another embodiment of the disclosure, the UE may obtain preset transmission power pattern information from the BS, and may receive a transmission power change indicator from the BS at a time identified based on the transmission power pattern information. Also, the UE may receive a CSI-RS transmitted with transmission power changed based on a transmission power pattern. Here, the preset transmission power pattern information in the disclosure may correspond to information about transmission powers of the BS, among FD CRB configuration conditions for configuring an FD CRB. Also, the preset transmission power pattern information may be determined based on a power level according to a time-frequency resource configured in previous signal transmission, the number of ports, a combination of ports, precoding, and/or a form of a transmission beam.

According to another embodiment of the disclosure, the UE may receive a transmission power indicator from the BS. Also, the UE may receive a CSI-RS transmitted based on transmission power corresponding to the transmission power indicator.

Also, the UE may transmit, to the BS, a CQI determined based on the received CSI-RS.

According to an embodiment of the disclosure, the UE may measure the CQI based on the CSI-RS transmitted from the BS according to preset transmission power with respect to the CSI-RS.

According to another embodiment of the disclosure, the UE may measure a CQI based on a CSI-RS transmitted from the BS according to transmission power changed based on a transmission power pattern.

According to an embodiment of the disclosure, the UE may measure a CQI based on the CSI-RS transmitted based on the transmission power corresponding to the transmission power indicator.

Figure 9:
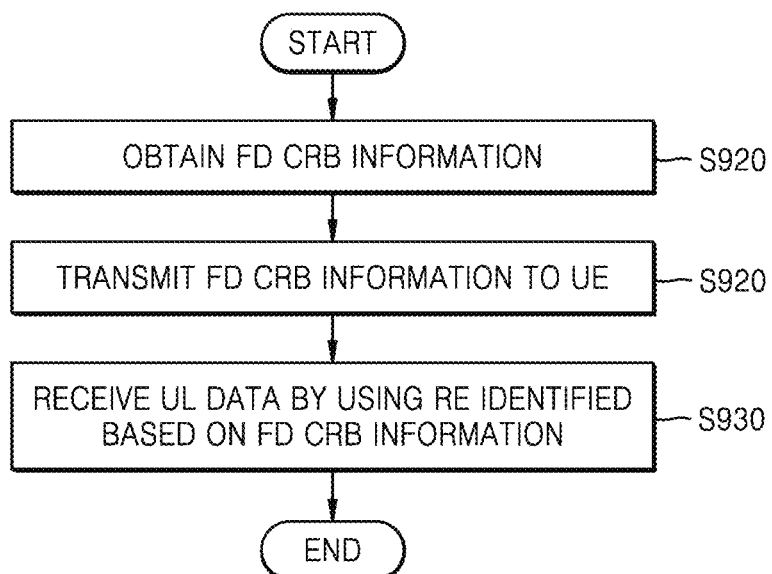
FIG. 9 is a flowchart of a method by which a base station (BS) transmits and receives signals in a wireless communication system according to an embodiment of the disclosure.

FIG. 9 is a flowchart of a method by which a BS transmits and receives signals in a wireless communication system according to an embodiment of the disclosure.

In operation S910, the BS may obtain FD CRB information.

According to an embodiment of the disclosure, the FD CRB information may be indicated by an index corresponding to an FD CRB configuration condition. Also, the FD CRB configuration condition may include at least one of the number of ports, a port type, or transmission power.

In operation S920, the BS may transmit the FD CRB information.

According to an embodiment of the disclosure, the BS may transmit the FD CRB information by RRC signaling or DCI including the FD CRB information.

In operation S930, the BS may receive UL data by using an RE usable for UL data transmission, the RE being identified based on the FD CRB information.

Also, the BS may transmit a CSI-RS to a UE.

According to an embodiment of the disclosure, the FD CRB information may include information about transmission power to be adjusted for the RE usable for UL data transmission. Here, based on the adjusted transmission power, the BS may adjust transmission power for a PDSCH among the PDSCH and the CSI-RS which are transmitted by using the identified RE. Also, the BS may transmit the PDSCH and the CSI-RS, based on a result of the adjustment.

According to another embodiment of the disclosure, the BS may transmit a transmission power change indicator to the UE at a time of transmission power change. Also, the BS may change transmission power, based on preset transmission power pattern information. Also, the BS may transmit a CSI-RS based on the changed transmission power.

According to another embodiment of the disclosure, the BS may transmit a transmission power indicator to the UE. Also, the BS may transmit a CSI-RS based on transmission power corresponding to the transmission power indicator.

Afterward, the BS may receive, from the UE, a CQI determined based on the transmitted CSI-RS.

Figure 10:
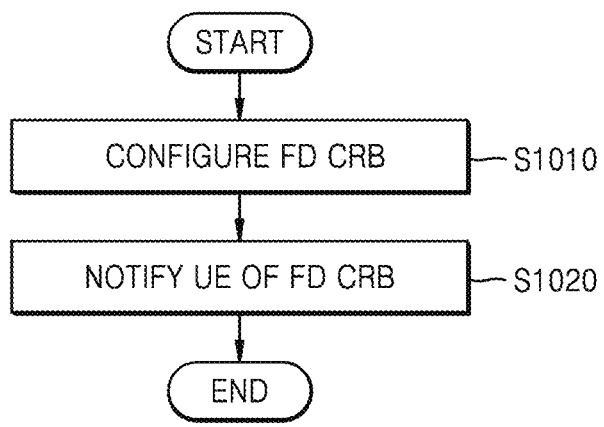
FIG. 10 is a flowchart by a BS that supports a full duplex operation controls power according to an embodiment of the disclosure.

FIG. 10 is a flowchart by a BS that supports a full duplex operation controls power according to an embodiment of the disclosure.

Referring to FIG. 10, in operation S1010, the BS may configure an FD CRB.

In the disclosure, a bandwidth in which each BS operates may be divided in units of RBs, and then each RB may be numbered and referred to as a CRB.

Also, in the disclosure, a bandwidth allocated to the UE, not the BS, may be divided in units of RBs, and then each RB may be numbered and referred to as a PRB.

Here, the BS and the UE may communicate by using a CRB number or a PRB number, and a PRB of a certain UE may correspond to a CRB of a BS on a one-to-one basis. Therefore, mapping between a CRB and a PRB vary depending on viewpoints, and application of a CRB and application of a PRB may be easily induced from the contents of the disclosure.

The configuring of the FD CRB by the BS in operation S1010 according to an embodiment may indicate that a CRB in which an FD operation can be practically and meaningfully performed is determined when the BS supports an FD function. The BS according to an embodiment may configure a CRB as an FD CRB, the CRB corresponding to a band in which the BS can receive an UL signal. Also, the BS may configure a CRB as an FD CRB, the CRB corresponding to a band in which the UE can transmit an UL signal.

In order to support the FD function, a self-interference cancellation (SIC) operation for self-interference cancellation described above with reference to FIGS. 6, 7A, and 7B has to be performed by the BS. However, due to a limit in analog components of the RF SIC, only some CRBs in an entire operation CRB region can obtain an SIC gain for performing an FD operation. Therefore, in the disclosure, an FD CRB may indicate a CRB in which the BS can perform an FD operation at a meaningful level from among all CRBs of the BS. The FD CRB may be randomly configured by the BS and may be determined based on operation capacity of the BS and the like. However, the FD CRB may be reconfigured due to a change in a channel environment, and a list of FD CRBs may be updated after the reconfiguration, such that the BS and the UE can perform an operation equal to a previous one by using a reconfigured FD CRB.

The BS may determine an FD CRB, based on considerations below. For example, the BS may determine a particular RB as an FD CRB when a remaining self-interference level of the BS with respect to the particular RB is measured to be equal to or smaller than a particular level. Also, when a remaining self-interference level of the BS with respect to a particular RB is self-interference being equal to or greater than a particular level, the BS may determine the particular RB as a half-duplex carrier resource block (HD CRB). Therefore, when the BS can adjust DL transmission power, a list of FD CRBs configurable according to the DL transmission power of the BS may be changed. In the disclosure, a list of FD CRBs may correspond to a FD CRB set list to be described below. The FD CRB set list will be further particularly described below.

In operation S1020, the BS may notify the UE of an FD CRB configured by using the method above.

Figure 11A:
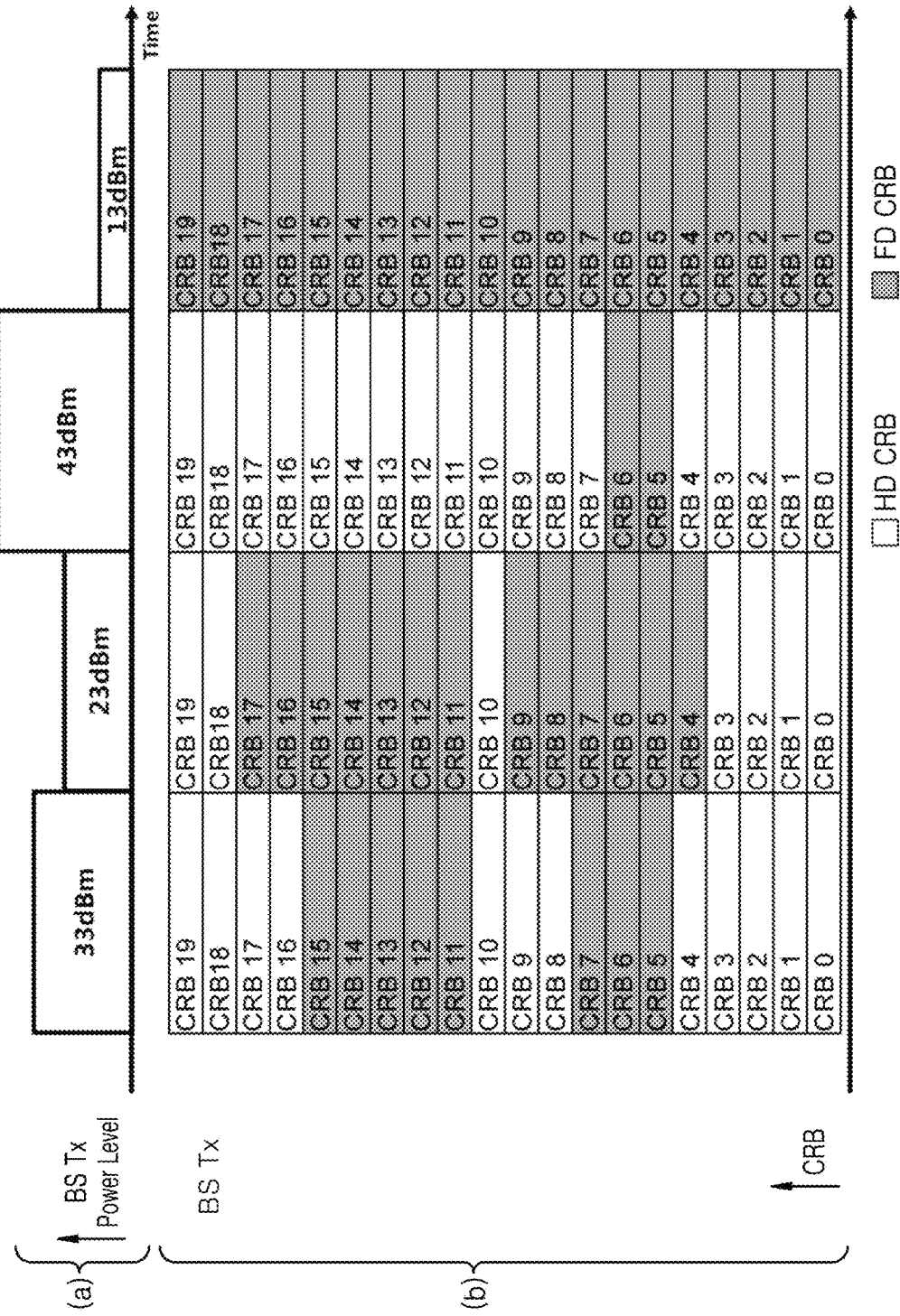
FIG. 11A illustrates changes in full duplex carrier resource blocks (FD CRBs) depending on changes in transmission power of a BS according to an embodiment of the disclosure.

FIG. 11A illustrates changes in FD CRBs depending on changes in transmission power of a BS according to an embodiment of the disclosure.

In this example, the number of CRBs of the BS is 20, but is not limited thereto, and the disclosure is equally applicable to a case where the number of CRBs of the BS is random N. Also, in this example, transmission power of the BS is configured of 4 steps of 43 dBm, 33 dBm, 23 dBm, and 13 dBm which are adjusted to differ by 10 dBm. However, the example of FIG. 11A is merely an embodiment of the disclosure, and thus, the transmission power of the BS is not limited to the 4 steps and a difference therebetween is not limited to 10 dBm. This is merely an example for briefly describing the concept of the disclosure, and thus, the number of adjustment steps of the transmission power of the BS and configuration of the transmission power may be flexibly adjusted.

In (a) of FIG. 11A, an example of transmission power of the BS is illustrated. In the example, the transmission power of the BS may be changed to 33 dBm, 23 dBm, 43 dBm, and 13 dBm according to time. In this drawing, transmission power is changed at uniform time intervals, but this is merely an example, and thus, the transmission power may be flexibly changed. Also, levels of the transmission power of the BS are changed with a certain pattern, but the transmission power of the BS may be randomly determined according to a decision by the BS. Detailed definition about a change in the transmission power will be provided in another embodiment.

Figures 11B, 12:
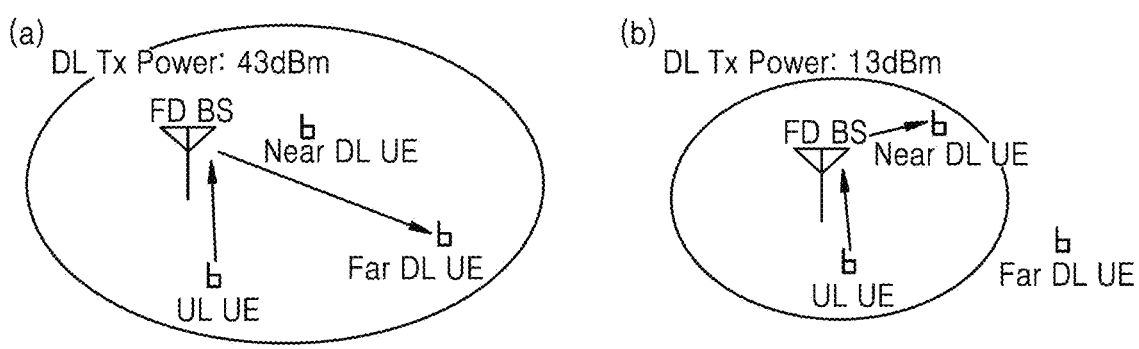
FIG. 11B is a diagram for describing an FD CRB set list according to an embodiment of the disclosure.
FIG. 12 is a diagram illustrating a scenario in which a BS adjusts transmission power of the BS according to distances between the BS and a UE according to an embodiment of the disclosure.

FIG. 12 is a diagram illustrating a scenario in which a BS adjusts transmission power of the BS according to distances between the BS and a UE according to an embodiment of the disclosure.

Referring to (a) of FIG. 12, according to an embodiment of the disclosure, the BS may service a UE with large transmission power for a case where the UE is far from the BS. Here, the BS may service the UE, which is far from the BS, with 43 dBm that corresponds to maximum transmission power of the embodiment.

Referring to (b) of FIG. 12, according to an embodiment of the disclosure, the BS may service a UE with 13 dBm that is small transmission power for a case where the UE is near the BS. Referring to (a) of FIG. 11A and (b) of FIG. 11A, when transmission power is lowered, an FD CRB in which the BS can perform an FD operation may be increased. Therefore, when there are many UL requests, the BS may service a DL UE in a short range with small transmission power and may allocate more resources to a UL UE by increasing an FD CRB. That is, transmission power of the BS may be determined, in consideration of link requests by the DL UE and the UL UE, a position of the DL UE, a distance between the BS and a UE, and the like.

Here, for the distance between the BS and the UE, information below may be considered. In the present example, the distance between the BS and the UE is not limited to an actual and physical distance between the BS and the UE. In the present example, the distance between the BS and the UE may indicate a distance converted according to reception power between the UE and the BS, and such converted distance may have more significant meaning than a physical distance. For example, if a UE can receive a DL only when the BS configures configurable maximum transmission power (43 dBm in the present example) with respect to random DL UE A, the BS may configure UE A as the UE in a long range. Also, if a UE can receive a DL even when the BS configures minimum transmission power (13 dBm in the present example) with respect to random DL UE B, the BS may configure UE B as the UE in a short range. Here, even when the UE B can receive with minimum transmission power, the BS does not always service the UE B with minimum transmission power, and thus, when the UE B desires to receive a service with a higher MCS, the BS may increase transmission power of the BS. An MCS configuration and procedure therefor will be described in another embodiment.

In (b) of FIG. 11A, a type of a CRB according to transmission power of the BS is illustrated. Here, the type of the CRB may indicate an HD CRB or an FD CRB. For descriptions of the drawing, CRBs are sequentially numbered from 0 as the smallest to 19.

In the present example, when the BS configures transmission power as 13 dBm that is the smallest transmission power, all CRBs from CRB #0 up to CRB #19 may operate as an FD CRB. That is, all CRBs from CRB #0 up to CRB #19 may be configured as the FD CRB. Accordingly, the BS may receive an UL signal in CRB #0 by using CRB #19. Also, the BS may transmit an UL signal in CRB #0 by using CRB #19. On the other hand, when the BS configures transmission power as 43 dBm that is the highest transmission power, only CRBs #5 to #6 may operate as an FD CRB. That is, only CRBs #5 to #6 may be configured as the FD CRB, and CRBs #0 to #4 and CRBs #7 to #19 may be configured as an HD CRB. Therefore, in this case, the BS may receive an UL signal by using CRBs #5 to #6. Also, the BS may transmit an UL signal by using CRBs #5 to #6. When transmission power of the BS is configured as 23 dBm or 33 dBm, the BS may use {CRBs #4 to #9, CRBs #11 to #17} or {CRBs #5 to #7, CRBs #11 to #15} as an FD CRB.

In the example, for convenience of descriptions, an FD CRB usable according to transmission power of the BS is fixed to CRBs at particular positions as shown in FIG. 11A. However, FD CRBs configured according to levels of transmission power are not limited to or configured as CRBs as shown in FIG. 11A, and may be changed according to performance of a self-interference cancellation function of the BS and may vary according to changes in a self-interference channel of the BS. For example, the BS in a particular case may have an excellent self-interference cancellation function and thus may use all CRBs for an FD operation with respect to all transmission power, and on the other hand, the BS in another particular case may have a poor self-interference cancellation function and thus is not able to use all CRBs as an FD CRB with respect to all transmission power.

Also, according to changes in a self-interference channel, a CRB used as an FD CRB at a particular time t may be used as an HD CRB at another time t'.

Also, in the disclosure, when a CRB is usable as an FD CRB, it may mean that self-interference is sufficiently removed from a specific CRB via a self-interference cancellation function operation of the BS. That is, it may mean that self-interference is sufficiently removed from a CRB used as an FD CRB such that the BS can receive a UL of a UE in the CRB. In detail, in the disclosure, when the BS is able to use a specific CRB as an FD CRB, it may mean that, when a UE transmits a UL, self-interference that occurs when the BS simultaneously transmits a DL is sufficiently removed, such that the BS can decode a UL signal without difficulty. Also, a CRB used as an FD CRB may indicate a CRB that has efficiency when the CRB is used for an UL.

Also, when a specific CRB is used as an HD CRB, it may mean that self-interference is too large with respect to the specific CRB and thus, even when the BS receives a UL, the BS cannot decode a UL signal. In more detail, when self-interference is too large, the BS cannot decode the UL signal and thus, the UE has to retransmit a UL of the UE, and in this regard, it is efficient for the UE not to transmit the UL, in consideration of resource management and power usage by the UE.

As shown in FIG. 11A, if the BS randomly changes transmission power of the BS, a CRB the BS can use as an FD CRB may vary. An FD CRB according to each level of transmission power is a value determined due to capability and self-interference channel of the BS, and thus, may be defined before transmission power is changed. Therefore, the BS may previously obtain an FB CRB set list of each level of transmission power, and may communicate with a UE by using it.

For convenience of descriptions, FD CRBs the BS can use to receive an UL are divided according to each level of transmission power of the BS in FIG. 11A, but the FD CRBs the BS can use to receive an UL are not always divided according to transmission power of the BS. The FD CRBs may be configured and set based on FD CRB configuration conditions including transmission power of the BS. As described above, for example, the FD CRB configuration conditions may include a form of a transmission beam, precoding, the number of antenna ports, a type of an antenna port, and the like.

Detailed information therefor will be provided in another embodiment.

First Embodiment

An embodiment below relates to a procedure in which a BS delivers, to a UE, an FD CRB set list usable as an FD CRB according to transmission power of the BS.

In order to perform an FD operation, the BS may remove self-interference. Here, in order to remove the self-interference, the BS may previously measure a self-interference channel and a self-interference level. Here, the amount of self-interference of the BS received in each sub-carrier may vary. In addition, the amount of self-interference that remains in each sub-carrier after the BS performs a self-interference cancellation function may vary in each sub-carrier. This is because the self-interference cancellation function may be performed at different levels for respective sub-carriers, and this results from a limit of a device configured to implement channel selectivity and RF self-interference cancellation function.

As defined above, when a minimum unit of a resource allocated to a UE from the BS is an RB, an RB that can obtain usability when the RB is used in an FD operation may be defined as an FD CRB, and an RB otherwise may be defined as an HD CRB. Also, an RB that can obtain usability when the RB is used in UL transmission and reception may be defined as an FD CRB, and an RB otherwise may be defined as an HD CRB. Here, when an RB can obtain usability, it means that, equally to the meaning of 'usable' defined above, the BS can receive UL data when the BS uses the RB in an FD operation.

The BS may transmit an FD CRB set list to the UE. The BS according to an embodiment of the disclosure may transmit, to the UE, a list of FD CRBs corresponding to respective indices. For example, the BS may transmit, for each index, an FD CRB set corresponding to each index to the UE. Also, as another example, the BS may transmit, for several indices, an FD CRB set corresponding to each index. Here, the FD CRB set may indicate one or more CRBs determined as FD CRBs, based on the FD CRB configuration conditions.

Also, the BS may notify the UE of an FD CRB according to a current FD CRB configuration condition by informing an index indicating each FD CRB set separately from or together with an FD CRB set list. In more detail, the BS may transmit an index to the UE so as to indicate an FD CRB set determined based on an FD CRB configuration condition.

In the disclosure, each index may correspond to each FD CRB configuration condition. That is, when CRBs usable as an FD CRB are determined according to an FD CRB configuration condition, an index may be allocated to correspond to the FD CRB configuration condition so as to indicate the UE with the determined FD CRB set.

Here, transmission power of the BS is simply included in the FD CRB configuration condition, and the FD CRB configuration condition is not limited to the transmission power of the BS.

As in the example described above, CRBs configured as an FD CRB may be changed depending on transmission power of the BS, and the like. Because the BS changes transmission power as in the example of FIG. 11A, FD CRBs according to levels of the transmission power may vary.

In more detail, with reference to FIG. 11B, an FD CRB set list in the disclosure may indicate a set of CRB lists or a list of FD CRB sets which can be used as an FD CRB and correspond to each index. That is, the FD CRB set list may include information about CRBs being included in an FD CRB set determined based on an FD CRB configuration condition according to configuration of the BS and information about an index to indicate the determined FD CRB set. Therefore, the FD CRB set list may include CRB position information of an FD CRB determined based on an FD CRB configuration condition, CRB number information, index information indicating each FD CRB set, and the like. Also, in the disclosure, the FD CRB set list may correspond to an FD CRB set list.

Also, an FD CRB set included in the FD CRB set list is determined based on the FD CRB configuration condition, but UE may not need to know all of FD CRB configuration conditions. Therefore, the BS may transmit, to the UE, the FD CRB configuration condition together with the FD CRB set list, or may transmit only necessary information among the FD CRB configuration condition, separately from the FD CRB set list. Alternatively, the BS may not transmit the FD CRB configuration condition to the UE.

Referring to FIG. 11B, an FD CRB set corresponding to index 1 of an FD CRB set list may be CRB #5 to CRB #7 and CRB #11 to CRB #15. Here, an FD CRB configuration condition corresponding to index 1 may include, but is not limited to, transmission power, the number of ports, a combination of ports, a form of a transmission beam, precoding, or the like, and for example, referring to (b) of FIG. 11, transmission power of the BS may be 33 dBm. Detailed descriptions of an FD CRB configuration condition will be provided below with reference to FIG. 14.

Also, FD CRBs corresponding to indices 2 to 4 of the FD CRB set list of FIG. 11B may be defined as an FD CRB set. Here, there are one or more indices, and one index may indicate one FD CRB set.

Figure 13:
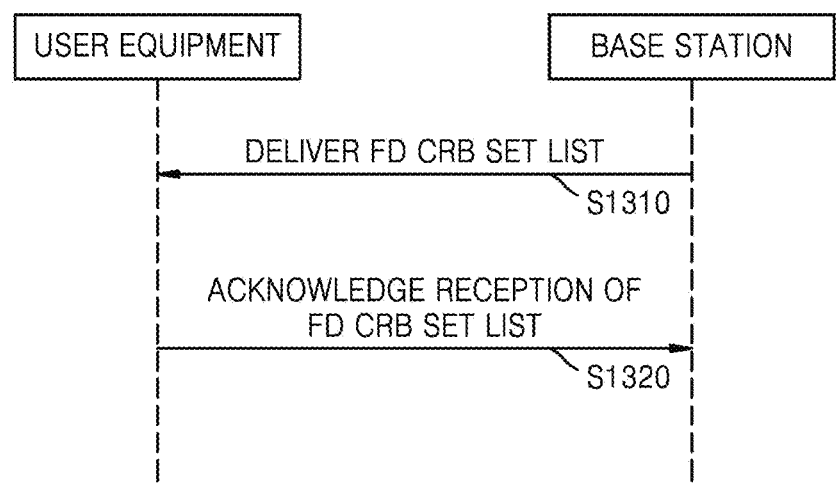
FIG. 13 is a flowchart of a method of changing transmission power based on an FD CRB set list according to an embodiment of the disclosure.

FIG. 13 is a flowchart of a method of changing transmission power based on an FD CRB set list according to an embodiment of the disclosure.

Referring to FIG. 13, in operation S1310, a BS may deliver an FD CRB set list to a UE, and in operation S1320, the UE may transmit a reception acknowledgment (ACK) to the BS after the UE receives the FD CRB set list. In operation S1310, a time when the FD CRB set list is transmitted to the UE may consider three cases below but is not limited thereto. Here, according to an embodiment of the disclosure, the time when the FD CRB set list is transmitted to the UE may be divided into a case of an initial access, a case where an FD CRB set list is changed in the BS, and a case where a BS to which the UE belongs is switched, and detailed descriptions thereof will be provided below.

According to an embodiment of the disclosure, the time when the FD CRB set list is transmitted to the UE may be after an initial access by the UE. After the initial access, the UE may receive, from the BS, additional information necessary for transmission and reception to and from the BS. Here, the BS may deliver an FD CRB set list to the UE. When the UE receives the FD CRB set list from the BS, the UE may identify that the BS supports an FD function. If the BS does not transmit the FD CRB set list, the UE may identify that the BS operates only in a half duplex manner. According to the embodiment above, in addition to a method by which the BS notifies the UE whether or not the BS supports an FD operation, by transmitting or not transmitting an FD CRB set list, the BS may notify whether an FD operation is to be activated, by transmitting a separate indicator to the UE.

Also, according to an embodiment of the disclosure, when the UE receives a plurality of FD CRB set lists from the BS, the UE may identify that the BS changes an FD CRB by adjusting transmission power or adjusting an FD function. As another example, when the UE receives one FD CRB set list from the BS, the UE may identify that the BS operates without changing the FD CRB set list.

According to another embodiment of the disclosure, the time when the FD CRB set list is transmitted to the UE may be a case where the FD CRB set list is changed in the BS even when the BS to which the UE belongs is not switched. When an FD CRB set list generated in the BS is changed due to a change in a self-interference channel or a change in a self-interference cancellation function of the BS, the BS has to notify the UE with a changed FD CRB set list. When the UE receives a new FD CRB set list from the BS, the UE may discard a previous FD CRB set list and may operate by applying the new FD CRB set list. Here, a time when the UE discards an FD CRB set list and applies a new FD CRB set list conforms to an agreement between the UE and the BS. Here, the UE may suspend a UL operation in an FD CRB until new transmission occurs.

Third, according to another embodiment of the disclosure, the time when the FD CRB set list is transmitted to the UE may be a case where a BS to which the UE belongs is switched. When the BS to which the UE belongs is switched as in a case where the UE moves or the BS is turned off, the UE may receive an FD CRB set list from a new BS. Here, with respect to the FD CRB set list of the new BS, the UE may interpret in a same manner as the UE interprets an FD CRB set list in an initial access.

In addition, when required, the BS may transmit a new FD CRB set list to the UE, and the UE may receive and store the new FD CRB set list and then may use it for an FD operation. As described above, a time when a new FD CRB set list is applied may vary according to an agreement between the UE and the BS.

Information the BS notifies the UE so as to transmit an FD CRB set list may include a plurality of pieces of information below.

The BS may transmit, to the UE, position information about CRBs being usable as an FD CRB from among all CRBs of the BS and an index corresponding to an FD CRB set therefor, as necessary information.

Here, positions of the CRBs being usable as an FD CRB may indicate positions of the CRBs configured as the FD CRB based on an FD CRB configuration condition. Here, an FD CRB set may be determined based on one FD CRB configuration condition. For example, the FD CRB set corresponding to the CRBs being usable as the FD CRB may be one-to-one mapped to transmission power of the BS which is configurable by the BS. For example, as in the example described with reference to FIG. 11A, CRBs #5 to #6 may be mapped as an FD CRB when transmission power of the BS is 43 dBm, CRBs #5 to #7 and CRBs #11 to #15 may be mapped as an FD CRB when transmission power of the BS is 33 dBm, CRBs #4 to #9 and CRBs #11 to #17 may be mapped as an FD CRB when transmission power of the BS is 23 dBm, and CRBs #0 to #19 may be mapped as an FD CRB when transmission power of the BS is 13 dBm. In the example above, transmission power and CRB number do not have preset meaning and are random values for convenience of descriptions.

Also, the BS may simultaneously or separately transmit an FD CRB configuration condition and the FD CRB set list, the FD CRB configuration condition being as information for an FD operation. For example, the BS may separately transmit, to the UE, transmission power to be mapped to an index of the FD CRB set list.

Figure 14:
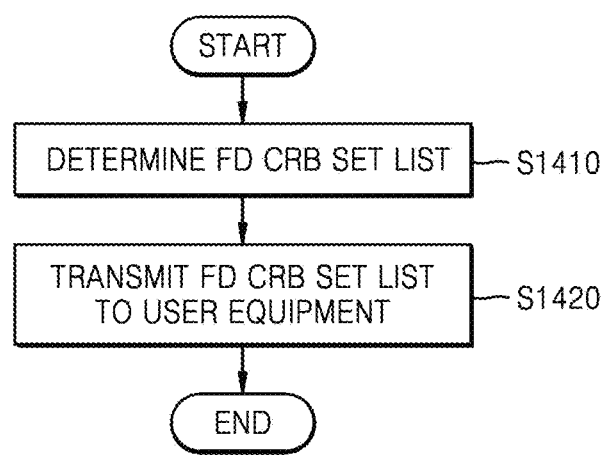
FIG. 14 is a flowchart of operations of a BS according to an embodiment of the disclosure.

FIG. 14 is a flowchart of operations of the BS according to an embodiment of the disclosure.

In more detail, FIG. 14 is a flowchart of a method by which the BS determines and transmits a CRB set list according to an embodiment of the disclosure. The flowchart of FIG. 14 may correspond to particular operations of the BS which correspond to S1310 of FIG. 13.

In operation S1410, the BS may priorly determine an FD CRB set list. Alternatively, the BS may priorly obtain the FD CRB set list.

As described above, the FD CRB set list may include FD CRBs determined according to particular transmission power of the BS, but an FD CRB configuration condition is not limited to the transmission power of the BS.

In the disclosure, the FD CRB configuration condition may indicate a condition for configuring the FD CRB set list. Also, the FD CRB configuration condition may indicate a condition for determining whether a CRB is an FD CRB. Also, the FD CRB configuration condition may indicate information for an FD operation. FD CRB configuration information may be information necessary for the BS to operate and may include configuration information of the BS, environment information, and the like. In more detail, for convenience of descriptions, the disclosure provides a method of configuring an FD CRB set list based on only transmission power.

The FD CRB configuration condition may include factors that can change a self-interference channel, the factors including transmission power, the number of ports, a combination of ports, a form of a transmission beam of the BS, precoding, or the like. Here, the FD CRB configuration condition may indicate one configuration factor or may indicate a combination of one or more configuration factors.

As in the example described above, an index may be defined to correspond to the FD CRB configuration condition. Also, an index may be defined in a manner that one index corresponds to a combination of configuration factors including transmission power, the number of ports, a port, or the like. Therefore, the BS may generate an FD CRB set by previously measuring, not the transmission power, factors including a form of a transmission beam of the BS, precoding, or the like which can change a self-interference channel, and the index of the FD CRB set list described above may be mapped according to a change in configuration of the BS.

In operation S1420, the BS may transmit the FD CRB set list with each index to the UE. The transmission with reference to FIG. 14 may include a UE operation of transmitting ACK to notify the BS of complete reception, and a BS operation of receiving the ACK and thus identifying UE reception of the FD CRB set list.

Figure 15:
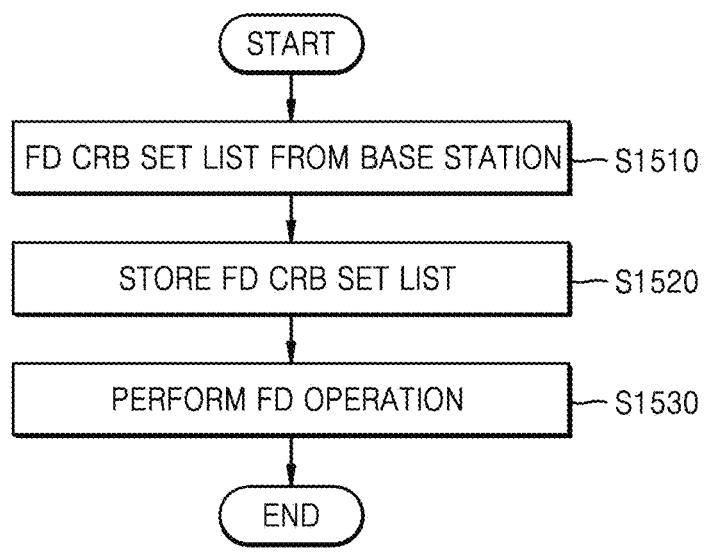
FIG. 15 is a flowchart of operations of a UE according to an embodiment of the disclosure.

FIG. 15 is a flowchart of operations of the UE according to an embodiment of the disclosure.

In more detail, FIG. 15 is a flowchart of a procedure in which the UE performs an FD operation based on a CRB set list according to an embodiment of the disclosure, and the flowchart of FIG. 15 may correspond to particular operations of the UE which correspond to S1320 of FIG. 13.

In operation S1510, the UE may receive, from the BS, an FD CRB set list configured by the BS. Here, as described above, reception by the UE may include an operation of acknowledging reception to the BS.

In operation S1520, the UE may store the FD CRB set list received from the BS.

Here, according to an embodiment of the disclosure, the UE may convert an FD CRB into a PRB number and store it. However, while the UE converted the FD CRB set list into PRB numbers and stored them, if a bandwidth part (BWP) of the UE is switched, the UE may reinterpret a BWP to thereby map a PRB. Also, for a case where the BWP of the UE is switched, the BS may re-transmit an FD CRB set list.

In operation S1530, the UE may perform an FD operation. In the disclosure, to perform an FD operation may correspond to a case where, after the UE receives an FD CRB set list, the UE interprets the FD CRB set list and thus performs a different operation, compared to a previous one. In more detail, the UE may identify a CRB combination or an FD CRB set, which corresponds to each index transmitted by the BS, from the FD CRB set list received from the BS. Also, the UE may transmit an UL by using a CRB combination or an FD CRB set in the FD CRB set list, based on an index transmitted by the BS. An operating method therefor will be described in detail in an embodiment below.

Second Embodiment

The embodiment below relates to a CQI measurement operation of the UE when the BS notifies the UE of an FD CRB and transmission power mapped thereto in the first embodiment.

As described above, the UE may measure a CSI-RS to measure a channel between the BS and the UE. Also, the UE converts a measured result into a CQI based on the measured CSI-RS level to inform the BS of a channel state, and then reports the CQI to the BS.

Here, when the BS according to the disclosure changes DL transmission power and operates, there is a possibility that the UE measures different transmission power when measuring the CSI-RS. This may cause the UE to generate an incorrect CQI, and in order to solve this problem, an embodiment below will now be provided.

Second-1 Embodiment

The embodiment below relates to a method by which the BS maintains transmission power at a constant level to maintain same CSI-RS transmission power for the UE, the transmission power being associated with a time including a particular point of time when a CSI-RS is transmitted.

Figure 16:
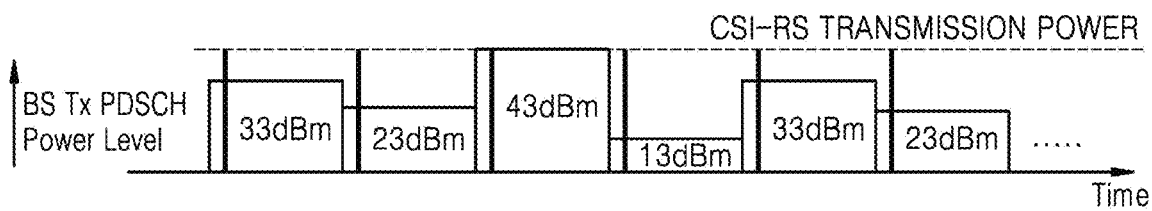
FIG. 16 is a diagram illustrating an example of transmission power adjustment by a BS, according to an embodiment of the disclosure.

FIG. 16 is a diagram illustrating an example of transmission power adjustment by the BS, according to an embodiment of the disclosure.

In more detail, FIG. 16 is a diagram of a method by which, when the BS changes transmission power, the BS transmits a CSI-RS with same CSI-RS transmission power for CQI measurement by the UE, according to an embodiment of the disclosure. Also, FIG. 16 illustrates PDSCH transmission power and CSI-RS transmission power of the BS.

In the present embodiment, the PDSCH transmission power may indicate transmission power used by the BS to transmit data to the UE. Also, the CSI-RS transmission power may indicate transmission power used by the BS to transmit a CSI-RS to the UE.

In the present embodiment, the BS may flexibly change transmission power for transmission of data. However, with respect to a time when the BS transmits a CSI-RS to the UE, the BS may transmit the CSI-RS with preset transmission power. On the other hand, with respect to a time when a CSI-RS is not transmitted, the BS transmits transmission power, according to determination by the BS.

According to the disclosure, even when transmission power of the BS is changed, accuracy of CQI measurement may be maintained.

Figure 17:
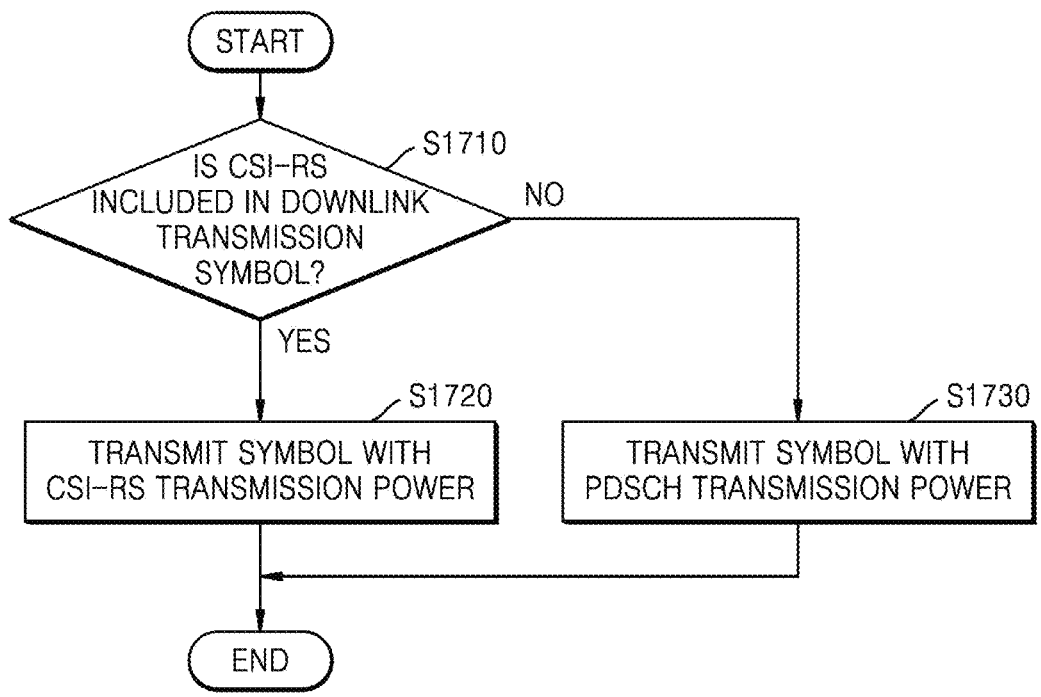
FIG. 17 is a flowchart of a method by which a BS determines transmission power, according to an embodiment of the disclosure.

FIG. 17 is a flowchart of a method by which the BS determines transmission power, according to an embodiment of the disclosure.

In more detail, FIG. 17 is a flowchart of a method by which the BS determines power for transmission of a CSI-RS, according to an embodiment of the disclosure.

First, in operation S1710, the BS may determine whether the CSI-RS is included in a symbol.

Here, when the CSI-RS is included in the symbol to be transmitted by the BS, in operation S1720, the BS may transmit the symbol with CSI-RS transmission power.

Also, when the CSI-RS is not included in the symbol to be transmitted by the BS, in operation S1730, the BS may transmit the symbol with transmission power according to a proposed operation. In more detail, in operation S1730, the BS may transmit the symbol with PDSCH transmission power.

In the disclosure, the CSI-RS transmission power may be the CSI-RS transmission power agreed between the BS and the UE. Also, the CSI-RS transmission power may be maximum transmission power transmittable by the BS or may be transmission power pre-notified to the UE by the BS, but the CSI-RS transmission power is not limited to the above examples. The concept of the present embodiment is that the BS constantly maintains transmission power allocated for a time when the UE measures a CQI.

Also, in the disclosure, the PDSCH transmission power indicates transmission power used by the BS to adjust transmission power to adjust an FD CRB for an improved FD operation, and is a term corresponding to general transmission power of the BS described above.

Figure 18:
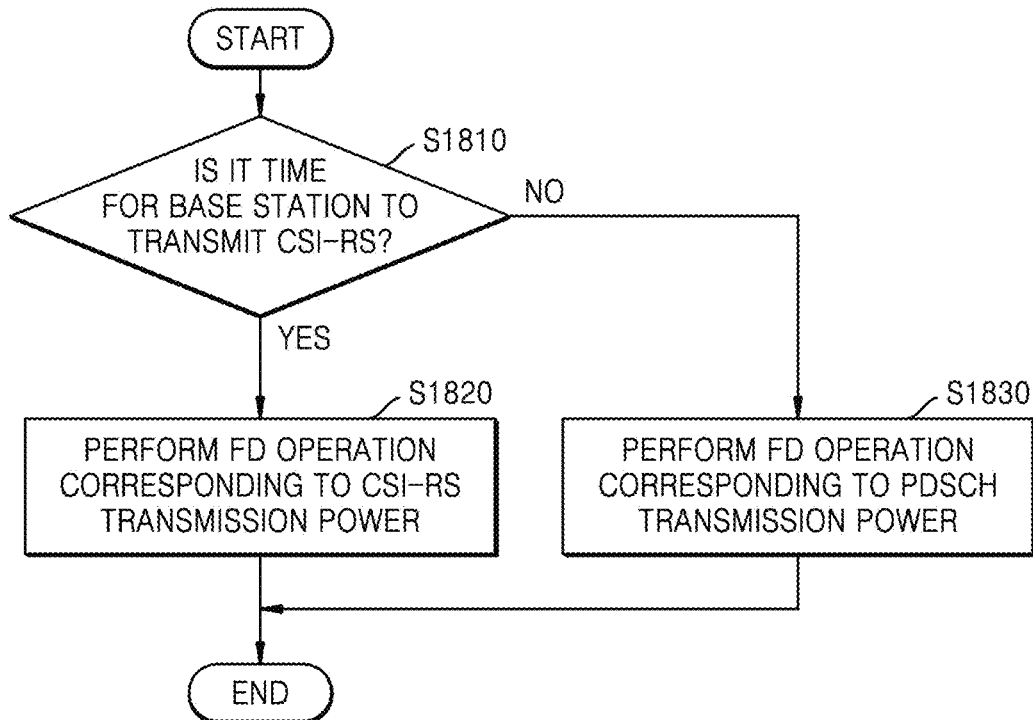
FIG. 18 is a flowchart of a procedure in which a UE determines an operation according to an embodiment of the disclosure.

FIG. 18 is a flowchart of a procedure in which the UE determines an operation according to an embodiment of the disclosure.

In more detail, FIG. 18 is a flowchart of a method by which the UE performs an operation according to a CSI-RS received from the BS, according to an embodiment of the disclosure.

First, in operation S1810, the UE may determine whether it is a time at which the BS is to transmit a CSI-RS.

When the UE determines that it is the time at which the CSI-RS is to be received from the BS, in operation S1820, the UE may perform an FD operation corresponding to CSI-RS transmission power with respect to a symbol including the CSI-RS and the time at which the BS transmits the CSI-RS.

Here, in order to match symbol power of a PDSCH including the CSI-RS, the UE may decrease power of a symbol PDSCH RE corresponding thereto. In more detail, when the UE performs the FD operation corresponding to the CSI-RS transmission power, it may mean that, in terms of DL UE, the UE receives a DL signal according to the CSI-RS transmission power. Here, a UE operation of receiving a signal may include an operation of decoding data transmitted from the BS, or an operation of collecting channel information by measuring a CSI-RS.

Here, a PUSCH symbol matched to the CSI-RS may be punctured and rate-matched for the operation. In more detail, when the UE, in terms of UL UE, performs an FD operation corresponding to CSI-RS transmission power, it may mean that the UE perform UL transmission, assuming that transmission power is the CSI-RS transmission power. The operation may include a method by which the UE does not perform UL transmission with respect to a symbol for CSI-RS transmission or operates assuming an FD CRB as an FD CRB corresponding to CSI-RS transmission power.

When the UE determines that it is not a time at which the CSI-RS is to be received from the BS, in operation S1830, the UE may perform an FD operation corresponding to PDSCH transmission power with respect to a symbol not including the CSI-RS and the time at which the CSI-RS is not transmitted.

Here, when the UE performs the FD operation corresponding to the PDSCH transmission power, it may mean that the UE operates assuming that transmission corresponds to a PDSCH. A detailed operation therefor may include a third embodiment.

Second-2 Embodiment

The embodiment below relates to a method by which the BS notifies the UE of transmission power of a CSI-RS by using a separate indicator, and thus, the UE refers to it when the UE generates a CQI based on the CSI-RS.

Figure 19:
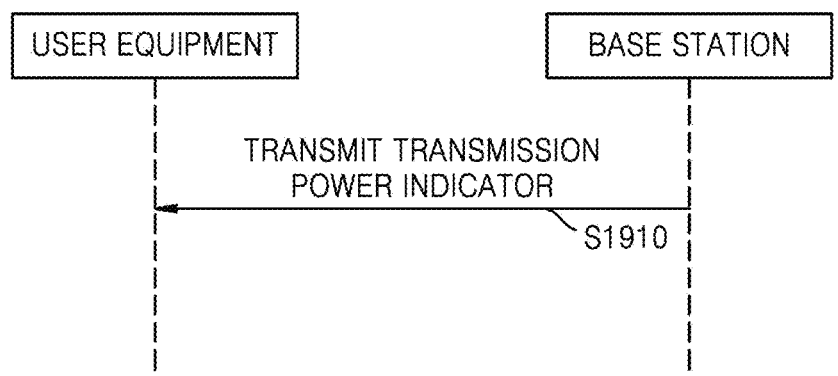
FIG. 19 is a diagram illustrating a transmission message from a BS to a UE, according to an embodiment of the disclosure.

FIG. 19 is a diagram illustrating a transmission message from the BS to the UE, according to an embodiment of the disclosure.

In more detail, FIG. 19 illustrates a method by which the BS transmits its transmission power to the UE by using a separate indicator according to an embodiment of the disclosure.

According to an embodiment of the disclosure, in operation S1910, the BS may transmit a transmission power indicator. In more detail, in order to deliver transmission power to the UE, the BS may allocate a separate bit, thereby notifying the transmission power.

Here, the transmission power indicator may be a signal to indicate transmission power from the BS to the UE, and transmission power indicators may respectively indicate different levels of transmission power.

For example, when transmission power of the BS is configured of 4 steps, the BS may allocate two bits and notify the UE that 00 indicates the smallest transmission power, 01 indicates the second-smallest transmission power, 10 indicates the third-smallest transmission power, and 11 indicates the largest transmission power.

As a transmission power indicator transmitted from the BS to the UE has to be received by all UEs, it is normal that the transmission power indicator is transmitted via a broadcasting channel or via a common search space all UE have to monitor, but the transmission power indicator may be transmitted by being included in DCI each UE separately receives. Also, a method by which the BS transmits a transmission power indicator is not limited to the example above.

According to an embodiment of the disclosure, a time when the transmission power indicator is transmitted from the BS to the UE may be determined to be a time when transmission power is changed, a time when every symbol is transmitted, or a time of a regular interval (e.g., transmission on every N symbol), but is not limited thereto.

Figure 20:
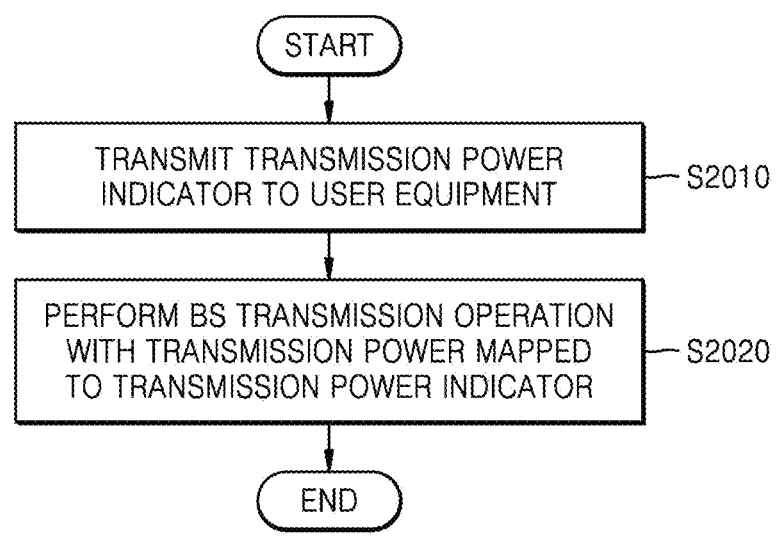
FIG. 20 is a diagram illustrating operations of a BS, according to an embodiment of the disclosure.

FIG. 20 is a diagram illustrating operations of the BS, according to an embodiment of the disclosure. In more detail, FIG. 20 illustrates a method by which the BS transmits a transmission power indicator to the UE and adjusts transmission power accordingly, according to an embodiment of the disclosure.

As described above, in operation S2010, the BS may notify the UE of a change in transmission power by using the transmission power indicator, and in operation S2020, the BS may change transmission power to correspond to the transmitted transmission power indicator.

Here, according to an embodiment, the BS may deliver a transmission power change indicator to the UE and may simultaneously change transmission power. According to another embodiment, the BS may change, in consideration of a decoding time of the UE, transmission power at time t+t' elapsed by certain time t' from time t at which the transmission power indicator is transmitted. After the BS transmitted the transmission power indicator, the BS may configure and transmit transmission power to transmission power indicated by the transmission power indicator. Here, the transmission by the BS may include all transmission operations from the BS to the UE. For example, the transmission by the BS may include CSI-RS transmission, PDSCH transmission, PDCCH transmission, and the like.

Figure 21:
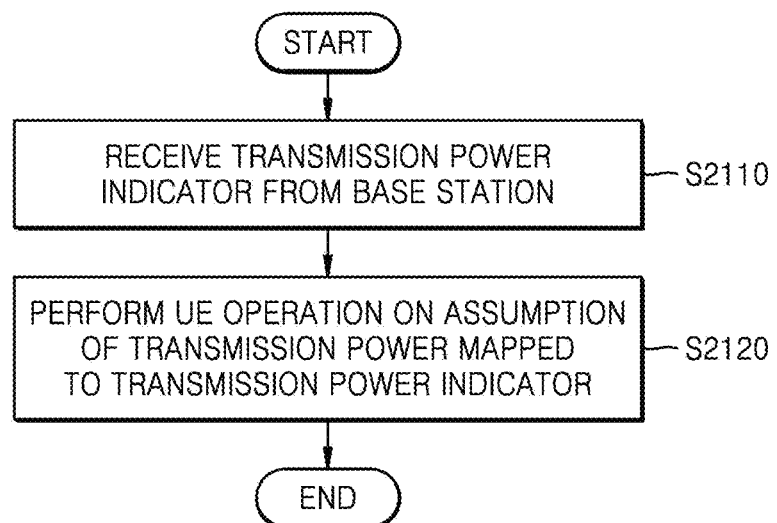
FIG. 21 is a flowchart of operations of a UE according to an embodiment of the disclosure.

FIG. 21 is a flowchart of operations of the UE according to an embodiment of the disclosure.

In more detail, FIG. 21 illustrates that the UE receives a transmission power indicator from the BS and performs a UE operation corresponding thereto.

In operation S2110, the UE may receive the transmission power indicator from the BS. Here, the UE may identify transmission power of the BS according to the transmission power indicator transmitted from the BS.

In operation S2120, the UE may perform a UE operation, assuming that the BS uses the transmission power mapped to the transmission power indicator.

In more detail, in terms of UL, the UE may assume the transmission power mapped to the transmission power indicator and then may measure a CQI, and may assume that the UE receives a PDSCH according to the transmission power indicated by the transmission power indicator. Also, in terms of UL, the UE may operate, assuming that an FD CRB set of the transmission power mapped to the transmission power indicator is to be used. A detailed operating method thereof will be described in an embodiment below. Here, a time when the transmission power indicator received by the UE is applied is the same as a time when the BS changes transmission power described with reference to FIG. 17.

Second-3 Embodiment

The embodiment below relates to, when the BS fixes, with few patterns, changes in transmission power of CSI-RS and operates with respect to the UE, a method by which the BS notifies the UE with the patterns and allows the UE to refer to them when generating a CQI.

Figure 22:
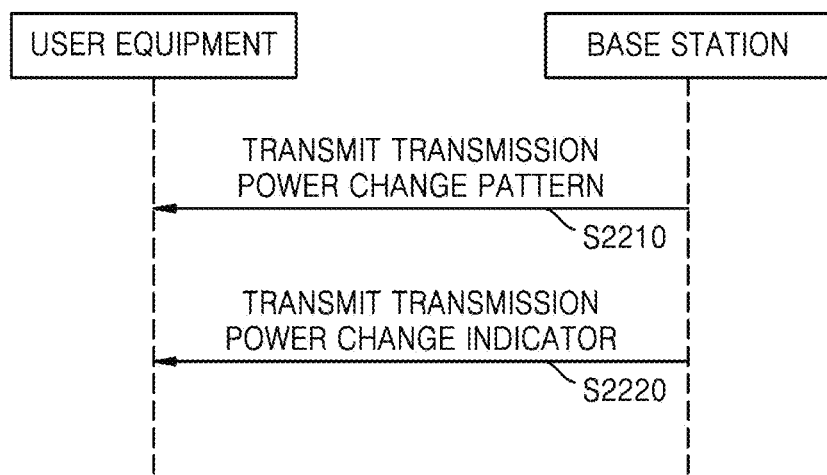
FIG. 22 is a diagram illustrating transmission messages from a BS to a UE, according to an embodiment of the disclosure.

FIG. 22 is a diagram illustrating transmission messages from the BS to the UE, according to an embodiment of the disclosure.

FIG. 22 illustrates that the BS transmits a transmission power change pattern to the UE at a particular time and then transmits the transmission power change pattern as an indicator, according to an embodiment of the disclosure.

In operation S2210, the BS may transmit a transmission power change pattern to the UE at a particular time.

Here, the transmission power change pattern the BS transmits to the UE with reference to FIG. 22 may indicate a pattern in which a change in transmission power usable by the BS is predefined. Also, information about the transmission power change pattern may correspond to information about levels of transmission power of the BS among an FD CRB configuration condition for configuring an FD CRB. Also, the information about the transmission power change pattern may be indicated as an index and may include transmission power change information. For example, in a case where the BS has A changeable levels of transmission power, transmission power of B sequential transmission times may have a total of $A^{\hat{B}}$ candidates. When indices of all sets or indices of the most-frequently usable candidates are designated and then notified to the UE, the UE may know in advance changes of transmission power at the B sequential transmission times.

In operation S2220, the BS may transmit a transmission power change indicator to the UE. Here, the transmission power change indicator may indicate a signal for indicating a change in transmission power when the transmission power is changed based on the transmission power change pattern transmitted from the BS to the UE. That is, the transmission power change pattern preset by the BS may be a pattern formed when levels of transmission power are repeated, whereas the transmission power change indicator may refer to an indicator for the BS to transmit a change in each level of transmission power to the UE.

Here, the UE may identify transmission power of the BS, based on the received transmission power change indicator, and may measure a CQI corresponding to the transmission power. Also, the UE may measure CQIs respectively corresponding to levels of transmission power of the BS, and may report the measured CQIs to the BS.

A procedure other than the aforementioned procedure may follow the operating method of the Second-2 embodiment.

In addition to the methods described in the embodiments, if the BS does not separately notify the UE of transmission power of CSI-RS (when an indicator is not transmitted, transmission power of CSI-RS is not fixed, or a CSI-RS transmission power pattern is not fixed), the UE may report a CSI-RS as an average value, a maximum value, a minimum value, or the like at a particular time, and the BS may estimate a CQI of the UE from the report. In more detail, the UE may measure SNRs for a certain time period and may report it to the BS. Here, the UE may report an average value, a maximum value, a minimum value, or the like of the SNRs for the certain time period, and the BS has to know which one of the average value, the maximum value, and the minimum value corresponds to a value reported by the UE. Here, the BS may inversely calculate a CQI based on mapping information between an SNR and the CQI corresponding thereto, and may determine MCS based on the CQI.

Third Embodiment

The embodiment below relates to a transmission method usable by the UE when an FD CRB that is simultaneously usable in UL transmission by the UE and the BS is changed as transmission power of the BS is changed.

Figure 23:
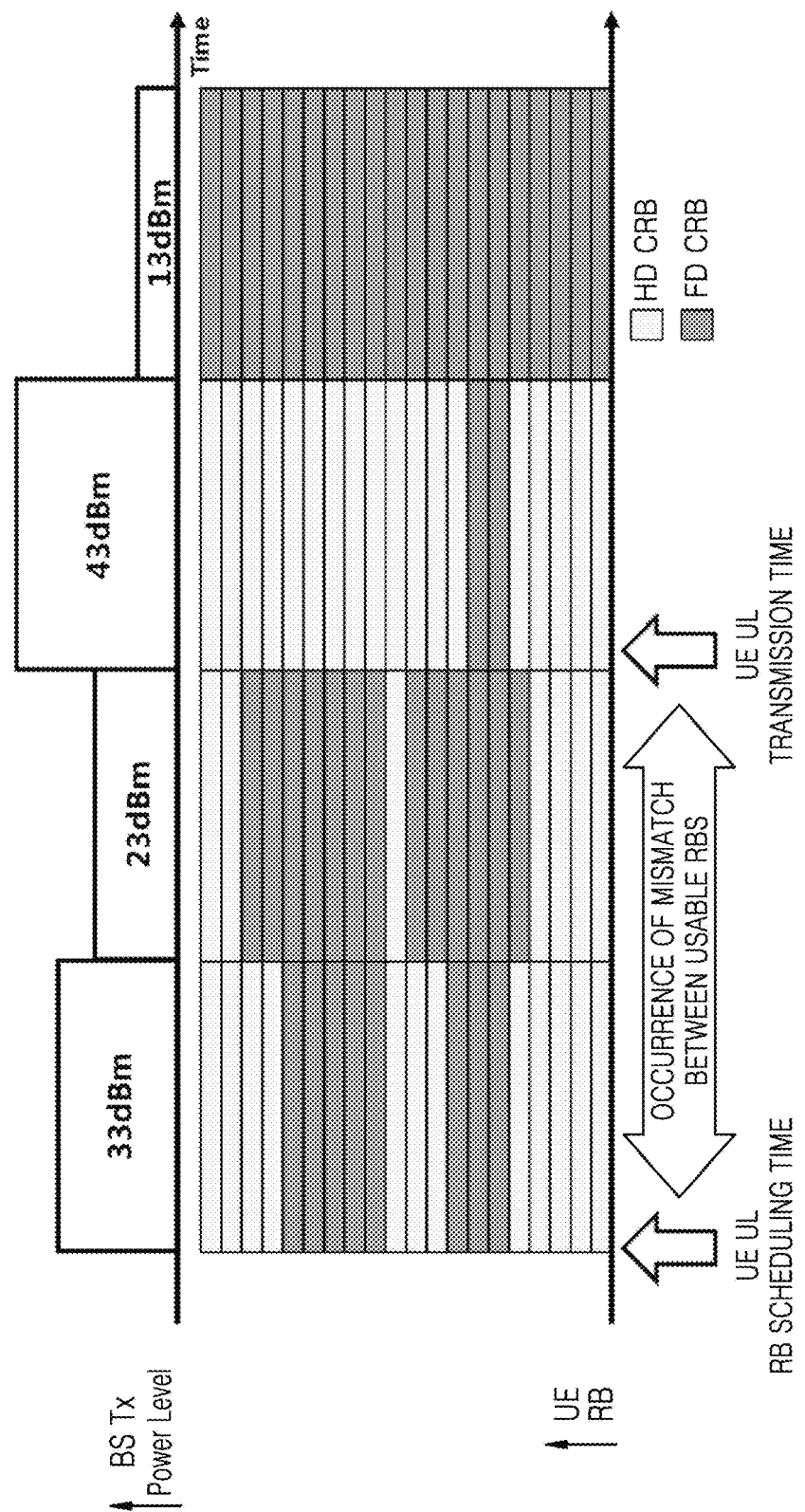
FIG. 23 is a diagram for describing a difference in FD CRBs between UL resource allocation time and transmission time of a UE, according to an embodiment of the disclosure.

FIG. 23 is a diagram for describing a difference in FD CRBs between UL resource allocation time and transmission time of the UE, according to an embodiment of the disclosure.

In more detail, FIG. 23 is a diagram illustrating that an FD CRB is changed as transmission power is changed, and accordingly, a usable RB at a time when the BS scheduled a UL resource of the UE is different from a usable RB a time when the UE actually performs UL transmission, according to an embodiment of the disclosure.

The present example illustrates a case where the BS changes and transmits transmission power with 33 dBm, 23 dBm, 43 dBm, and 13 dBm according to time. In the example, as transmission power of the BS is changed, a list of FD CRBs the UE can use for UL transmission is sequentially changed in order of {CRBs #5 to #7 and CRBs #11 to #15}, {CRBs #4 to #9 and CRBs #11 to #17}, {CRBs #5 to #6}, {CRBs #0 to #19}.

In this regard, with reference to FIG. 23, the BS may allocate a resource for UE transmission by the UE to the UE at UE UL RB scheduling time t. However, a time when the UE actually performs UL transmission may be time t+t' after an elapse of certain time t'. Therefore, a situation may occur, in which transmission power at a time when the UE is allocated a resource for UL transmission from the BS is different from transmission power of the BS at a time when the UE actually performs UL transmission.

According to an embodiment, with reference to FIG. 23, transmission power of the BS at a time when the UE is allocated a resource for UL transmission from the BS is 33 dBm, whereas transmission power of the BS at a time when the UE actually transmits a UL is changed to 43 dBm. Due to that, if the UE is allocated, from the BS, CRBs as well as CRBs #5 to #6 having efficiency in 43 dBm and transmits a UL, the BS may not properly receive data transmitted in a CRB without efficiency. Therefore, even when a CRB is allocated from the BS at a UL scheduling time according to a change in transmission power of the BS, if the CRB is not efficient in a UL transmission time, the UE may consider non-transmission.

Figure 24:
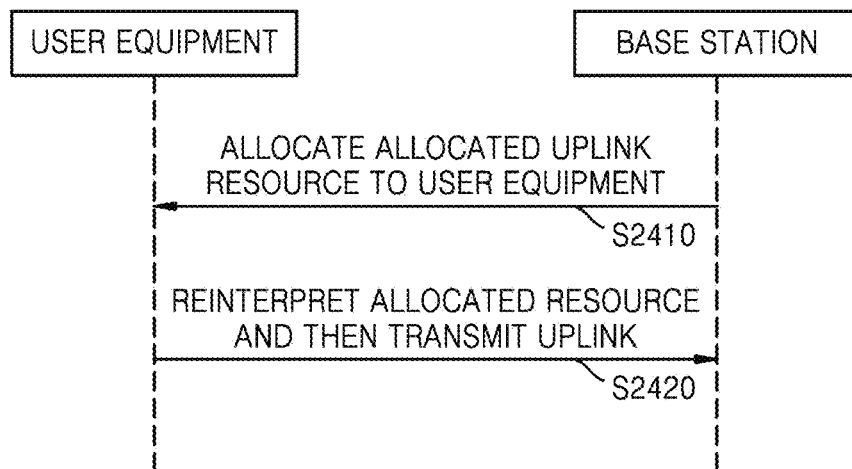
FIG. 24 is a diagram of a data transmission flow between a UE and a BS, according to an embodiment of the disclosure.

FIG. 24 is a diagram of a data transmission flow between the UE and the BS, according to an embodiment of the disclosure.

As illustrated in FIG. 24, in the embodiments below, a method by which the UE can interpret an FD CRB set transmitted from the BS, by considering transmission power of the BS with a valid part of a CRB.

In operation S2410, the BS may allocate an allocated UL resource to the UE. Also, in operation S2420, the UE may reinterpret the allocated resource and then transmit a UL. Hereinafter, an embodiment which corresponds to operation S2420 and in which the allocated resource is reinterpreted and then a UL is transmitted will now be described.

Third-1 Embodiment

The embodiment below relates to a method by which the UE generates intersection of an RB allocated from the BS and an FD CRB changed in response to transmission power of the BS, and uses the intersection as a resource for UL transmission.

Figure 25:
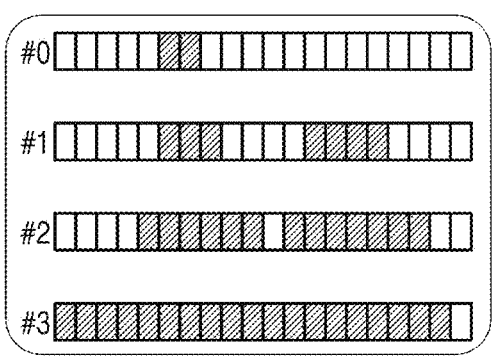
FIG. 25 is a diagram illustrating a CRB interpretation method of a UE, according to an embodiment of the disclosure.
Figure 25:
Figure 25:
Figure 25:
Figure 25:
Figure 25:

FIG. 25 is a diagram illustrating a CRB interpretation method of the UE, according to an embodiment of the disclosure.

Referring to (a) of FIG. 25, a UL PDSCH region by an RIV or a grant-free access resource allocated may indicate a transmission resource according to a result of interpretation in which a resource allocated from the BS to the UE via a control channel is assumed to be equal to a previous UL resource, regardless of a FD CRB region.

Referring to (b) of FIG. 25, an available region according to Tx Power Level indicates a CRB with efficiency when it is used for the UE to perform UL transmission according to transmission power of the BS.

Here, according to an embodiment of the disclosure, the available region according to Tx Power Level may be preset as an FD CRB set list.

According to an embodiment of the disclosure, the UE may identify an FD CRB set from FD CRB information. Also, the UE may identify, as an RE, an RB overlapping with a UL PDSCH RB region allocated by an RIV and an FD CRB set.

In the present embodiment, the UE performs UL transmission only in a CRB co-existing in the resource allocated via the control channel and the FD CRB set list. For example, even when the BS allocated a particular RB to the UE via the control channel, if the corresponding RB does not exist in a CRB list corresponding to transmission power of the BS at a time when the UE actually performs UL transmission, the UE may not perform UL transmission on the particular RB.

Figure 26:
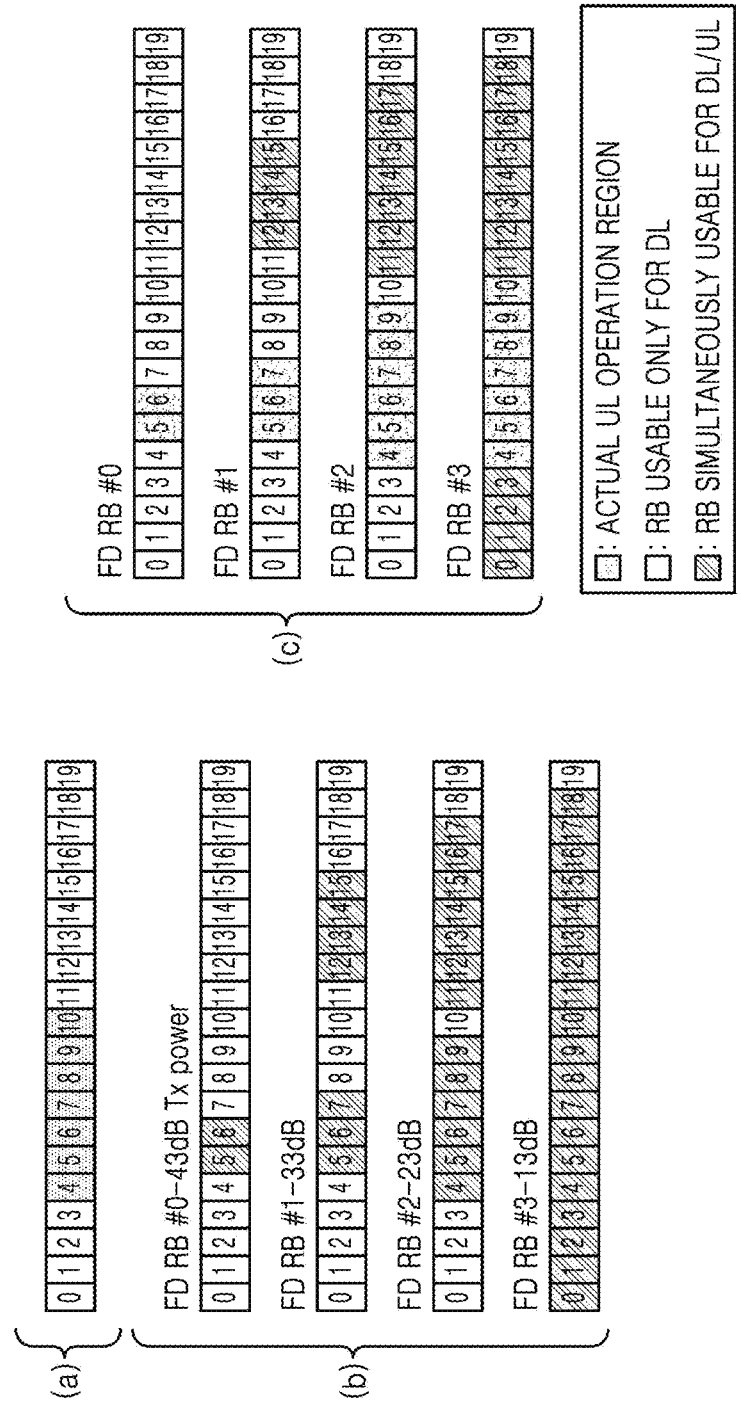
FIG. 26 is a diagram illustrating an interpretation example according to a CRB interpretation method of a UE, according to an embodiment of the disclosure.

FIG. 26 is a diagram illustrating an interpretation example according to a CRB interpretation method of the UE, according to an embodiment of the disclosure.

FIG. 26 illustrates an example of actual transmission RB according to transmission power of the BS at UL transmission time of the UE when the UE is allocated RBs of nos. 4 to 10 from the BS.

That is, referring to (a) of FIG. 26, the UE may be allocated the RBs of nos. 4 to 10 from the BS. For example, it may be assumed that the UE is allocated RBs of nos. 4 to 10 of a UL PDSCH region by an RIV. Alternatively, it may be assumed that the UE is allocated RBs of nos. 4 to 10 as an access resource for grant-free.

Referring to (b) of FIG. 26, regions in which a UL is scheduled for respective levels of transmission power of the BS are shown. In more detail, RBs of (b) of FIG. 26 may be divided into an RB only usable for DL and an RB simultaneously usable for DL/UL. Here, the RB simultaneously usable for DL/UL may indicate an RB on which the BS can receive a UL and may indicate an RB on which the UE can transmit a UL. Also, the BS may transmit a DL by using the RB and the UE may receive a DL by using the RB. However, it is not on the premise that the BS has to receive a UL by using the RB and has to transmit a DL by using the RB. Features described above may be equally applied to drawings below.

Also, RBs of (b) of FIG. 26 may correspond to the FD CRB sets configured in the FD CRB set list according to the above embodiment of the disclosure. Also, as described above, FIG. 26 illustrates only transmission power of the BS, but configuration elements as well as the transmission power of the BS included in the FD CRB configuration condition may also be considered when the FD CRB set is configured.

Referring to (c) of FIG. 26, an example in which the UE reinterpreted an allocated resource so as to determine a CRB for UL is shown. According to an embodiment of the disclosure, the UE may transmit an UL in a CRB determined by reinterpreting an allocated resource.

For example, when the UE has received an index of FD RB #0, the UE may transmit an UL only on RBs corresponding to intersection between allocated RBs of nos. 4 to 10 in (a) of FIG. 26 and RBs of nos. 5 and 6 in (b) of FIG. 26.

As another example, when the UE has received an index of FD RB #2, the UE may transmit an UL only on RBs corresponding to intersection between RBs of nos. 4 to 10 in (a) of FIG. 26 and RBs of nos. 4 to 9 and 11 to 17 in (b) of FIG. 26. That is, referring to (b) of FIG. 26, although RBs of nos. 11 to 17 are allocated for UL transmission, due to a difference between a time when the BS schedules a UL and a time when the UE actually transmits a UL, the RBs of nos. 11 to 17 may be RBs that are not usable for UL transmission.

Third-2 Embodiment

The embodiment below relates to a method by which the UE performs interpretation by mapping an RB number allocated from the BS to a VRB number of an FD CRB changed according to transmission power of the BS. In particular, the present embodiment relates to a method of interpreting an FD CRB set list by sequentially applying VRB numbers.

Figure 27:
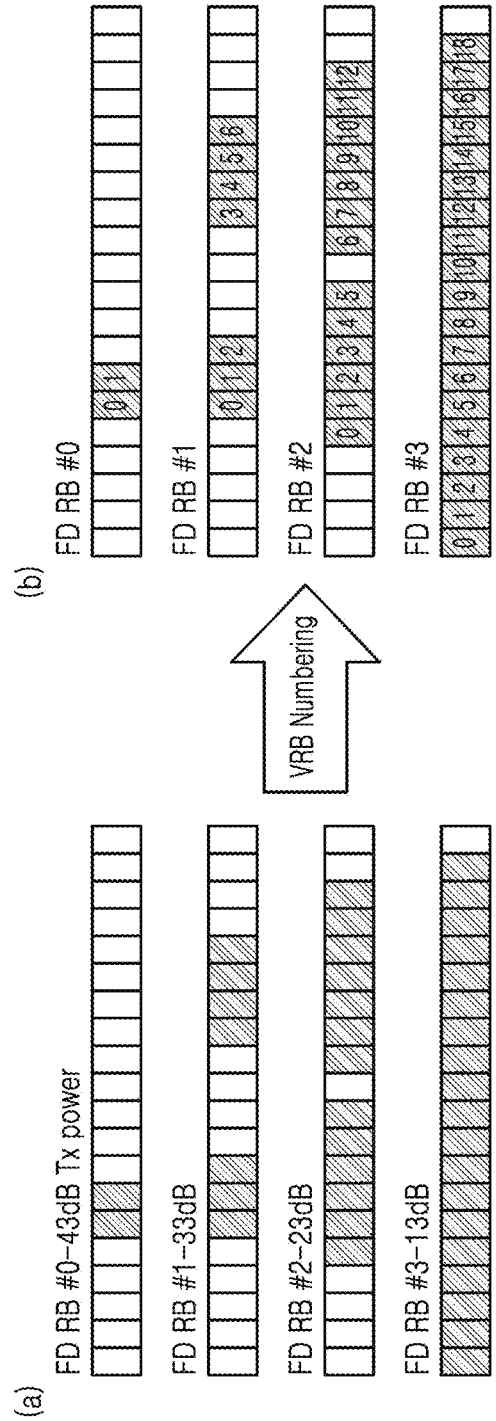
FIG. 27 is a diagram illustrating a CRB interpretation method of a UE, according to an embodiment of the disclosure.

FIG. 27 is a diagram illustrating a CRB interpretation method of the UE, according to an embodiment of the disclosure.

FIG. 27 illustrates an example of a method by which the UE is allocated numbers of CRBs usable for a UL according to respective levels of transmission power.

The UE may perform interpretation by applying a VRB number to a CRB sequentially from a CRB with a small number with respect to transmission power of each BS. In another embodiment of the disclosure, 0 as a VRB number may be applied to a CRB with a smallest number. For example, in the present embodiment, when transmission power is 43 dBm, CRBs #5 to #6 may be respectively mapped to VRBs #0 to #1. If transmission power is changed to 23 dBm, the same CRBs #5 to #6 may be respectively mapped to VRBs #1 to #2. Therefore, in the present embodiment, a VRB number to be mapped to a CRB may be changed as transmission power is changed.

According to an embodiment of the disclosure, the UE may identify an FD CRB set from FD CRB information, and may sequentially determine VRB numbers associated with respective FD CRBs included in the FD CRB set, based on a CRB order. Also, the UE may identify a CRB as an RE, the CRB having a VRB number associated with an FD CRB corresponding to a RB number allocated as a UL resource.

That is, in the present example, the UE may map VRBs in an FD RB operation order, and even when the BS allocates sequential resources, the UE may reinterpret them as non-sequential resources. When there is no RB number allocated according to transmission power (Tx power level) of the BS, the UE may not perform UL transmission by using an RB corresponding thereto.

Figure 28:
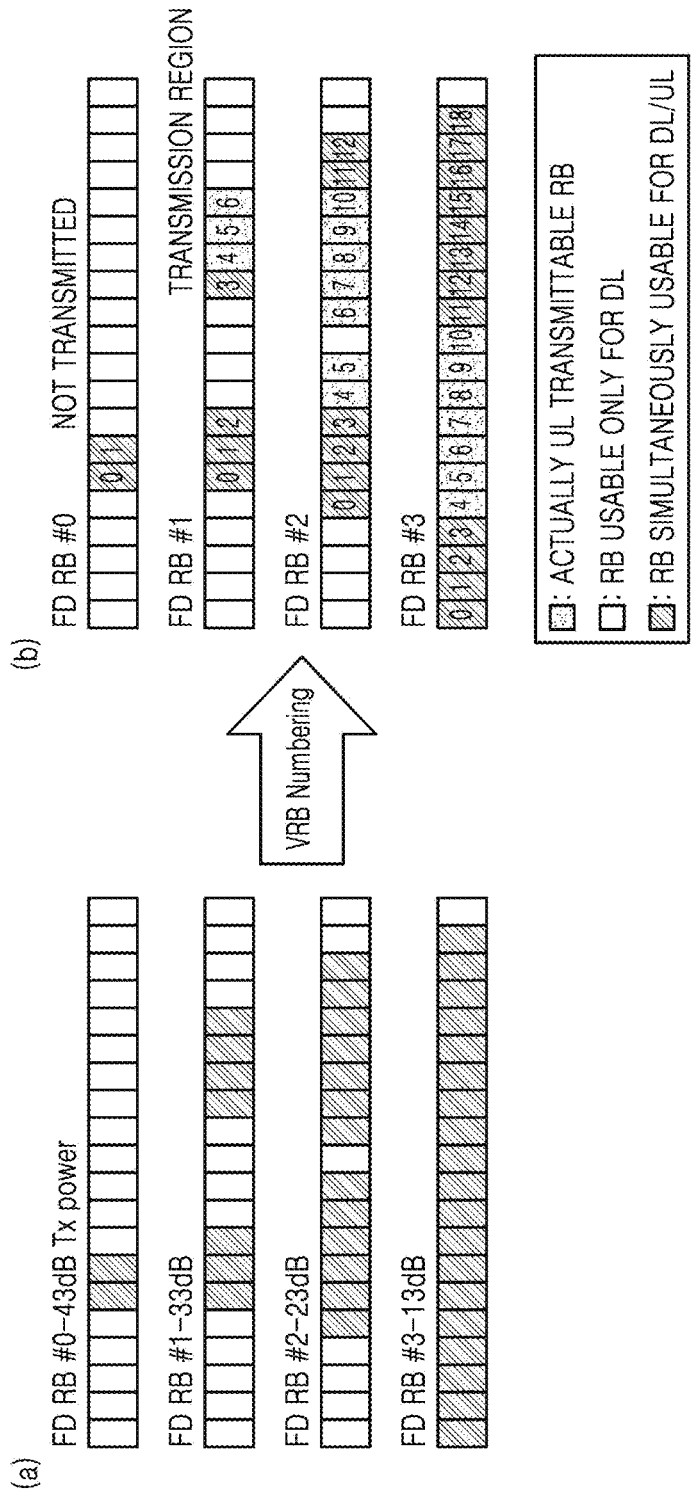
FIG. 28 is a diagram illustrating an interpretation example of a CRB interpretation method of a UE, according to an embodiment of the disclosure.

FIG. 28 is a diagram illustrating an interpretation example of a CRB interpretation method of the UE, according to an embodiment of the disclosure.

FIG. 28 illustrates an example of actually-transmittable RBs according to transmission power of the BS at a time of UL transmission by the UE when the UE is allocated RBs of nos. 4 to 10 from the BS.

Here, (a) of FIG. 28 illustrates FD CRBs and HD CRBs allocated for each transmission power of the BS. In more detail, referring to (a) of FIG. 28, it is apparent that RBs being simultaneously usable for DL and UL and RBs being usable only for DL are pre-configured.

Here, RBs in (a) of FIG. 28 may correspond to FD CRB sets configured from an FD CRB set list according to the embodiment of the disclosure. Also, as described above, FIG. 28 illustrates only transmission power of the BS, but configuration elements included in the FD CRB configuration condition may also be considered when the FD CRB set is configured (b) of FIG. 28 shows a result of reinterpreting a CRB for UL transmission based on transmission power of the BS which is currently received by the UE.

The UE may identify an FD CRB set from an allocated FD CRB set list, and may perform VRB numbering based a CRB order with respect to each FD CRB. For example, although the UE is allocated RBs of nos. 4 to 10 from the BS, CRBs that are VRB-numbered with 4 to 10 for the UE are not present for an index of FD RB #0. Accordingly, the UE does not transmit a UL on FD RB #0. As another example, in a case of an index of FD RB #1, there are CRBs numbered with VRBs #0 to #6. In this case, because the UE is allocated RBs of nos. 4 to 10 for a UL from the BS, the UE may transmit a UL by using CRBs numbered with VRBs #4 to #6.

Third-3 Embodiment

The embodiment below relates to a method by which the UE performs interpretation by mapping an RB number allocated from the BS to a VRB number of an FD CRB changed according to transmission power of the BS. In particular, the present embodiment relates to a method by which the UE operates by mapping always a same VRB number to an FD CRB set list.

Figure 29:
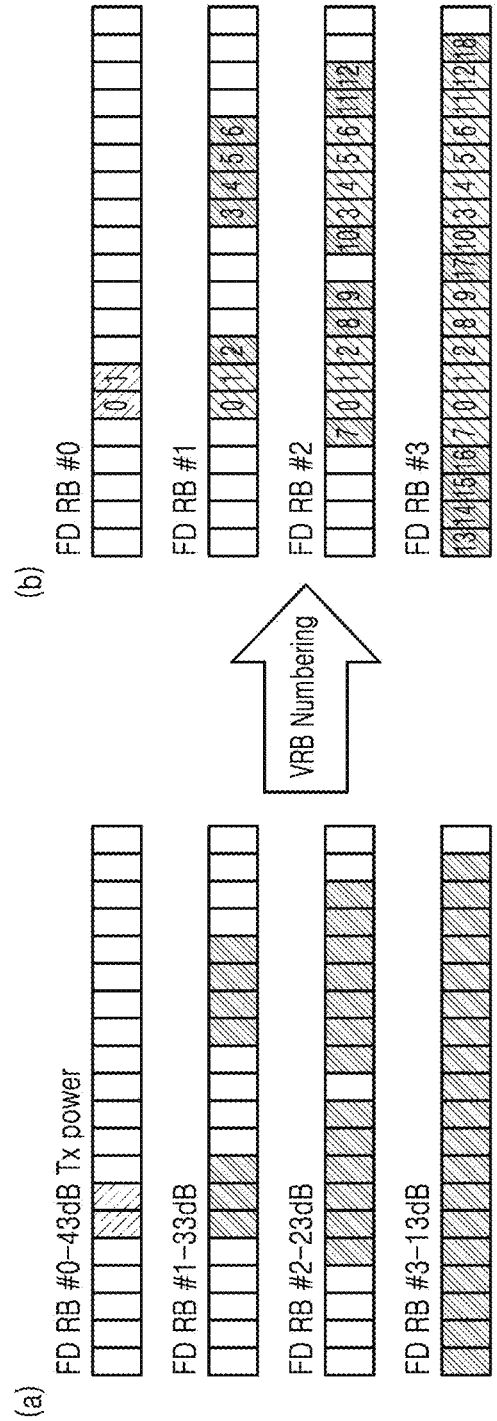
FIG. 29 is a diagram illustrating a CRB interpretation method of a UE, according to an embodiment of the disclosure.

FIG. 29 is a diagram illustrating a CRB interpretation method of the UE, according to an embodiment of the disclosure.

FIG. 29 illustrates an example in which the UE is allocated numbers of CRBs usable for a UL according to each transmission power.

The UE maps unique VRB numbers to CRBs in a CRB set list of the BS, the CRBs starting from a CRB usable for all levels of transmission power. For example, in the present example, CRBs #5 to #6 which are usable for all levels of transmission power are respectively mapped to VRBs #1 to #2. In this regard, even when transmission power is changed, a VRB number allocated to a CRB is uniquely maintained.

According to an embodiment of the disclosure, the UE may identify an FD CRB set from FD CRB information, and may determine a VRB number with respect to each FD CRB included in the FD CRB set, based on a UL resource allocation possibility. Here, the UE may identify a CRB as an RE, the CRB having a VRB number for an FD CRB corresponding to an RB number allocated as a UL resource.

Here, the UL resource allocation possibility may indicate a possibility that, based on the FD CRB set list, each CRB is to be allocated as a UL resource. In more detail, the UL resource allocation possibility may indicate a possibility that, based on the FD CRB set list, each FD CRB identified from the FD CRB set indicated by each index is included in an FD CRB set indicated by other indices. Also, the UL resource allocation possibility may indicate a possibility that, based on the FD CRB set list, a frequency of use calculated for each CRB as to whether each CRB is configurable as an FD CRB or a frequency of use calculated for each CRB as to whether each CRB is allocable as a UL resource.

That is, in the present example, the UE may map VRBs in an FD RB operation order, and even when the BS allocates sequential resources, the UE may reinterpret them as non-sequential resources. When there is no RB number allocated according to transmission power (Tx power level)

of the BS, the UE may not perform UL transmission by using an RB corresponding thereto.

Figure 30:
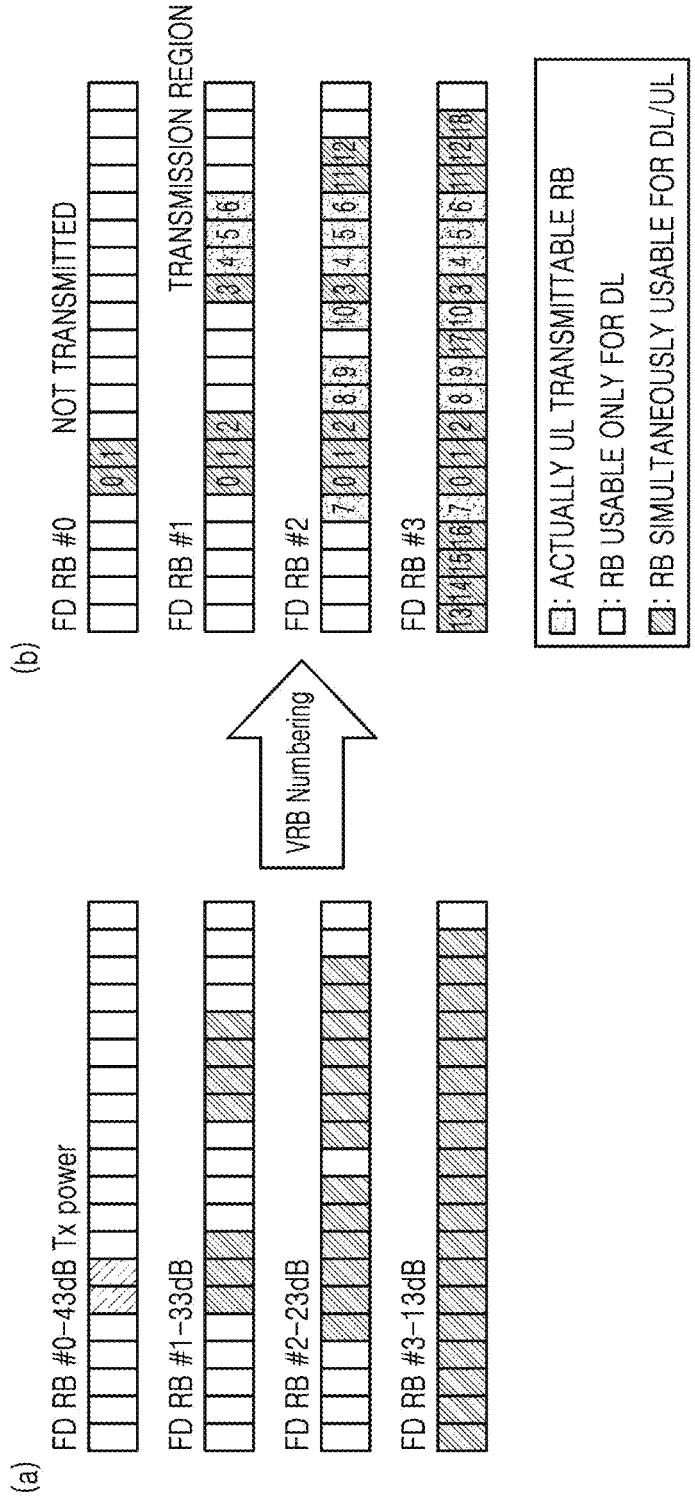
FIG. 30 is a diagram illustrating an interpretation example of a CRB interpretation method of the UE, according to an embodiment of the disclosure.

FIG. 30 is a diagram illustrating an interpretation example of a CRB interpretation method of the UE, according to an embodiment of the disclosure.

FIG. 30 illustrates an example of actually-transmittable RBs according to transmission power of the BS at a time of UL transmission by the UE when the UE is allocated RBs of nos. 4 to 10 from the BS.

Here, (a) of FIG. 30 illustrates FD CRBs and HD CRBs allocated for each transmission power of the BS. In more detail, referring to (a) of FIG. 30, it is apparent that RBs being simultaneously usable for DL and UL and RBs being usable only for DL are pre-configured.

Here, RBs in (a) of FIG. 30 may correspond to FD CRB sets configured from an FD CRB set list according to the embodiment of the disclosure. Also, as described above, FIG. 30 illustrates only transmission power of the BS, but configuration elements included in the FD CRB configuration condition may also be considered when the FD CRB set is configured (b) of FIG. 30 shows a result of reinterpreting a CRB for UL transmission based on transmission power of the BS which is currently received by the UE.

The UE may identify an FD CRB set from an FD CRB set list, and may number FD CRBs such that the FD CRBs of particular positions included in the FD CRB set are determined as a same VRB number. Here, for example, the UE may perform VRB numbering on each FD CRB, based on a UL resource allocation possibility. That is, the UE may determine VRB numbers of FD CRBs of particular positions which are most frequently allocated, based on each FD CRB set list. In a case where the UE transmits a UL by using an FD CRB corresponding to a VRB number determined based on such rule, the UE may transmit the UL by using the FD CRB with a high probability.

For example, referring to (b) of FIG. 30, the UE may perform VRB numbering from RB #5. Here, for example, it is apparent that CRB #5 is most frequently allocated as a UL resource for an FD CRB set list indicated by each index. In more detail, CRB #5 is allocated as a UL resource for FD CRB set lists respectively indicated by indices of FD RB #0, FD RB #1, FD RB #2, and FD RB #3. Also, with respect to CRB #11, it is apparent that CRB #11 is allocated as a UL resource for FD CRB set lists indicated by only indices of FD RB #2 and FD RB #3. Therefore, a UL resource allocation possibility of CRB #5 is higher than CRB #11. In this case, according to an embodiment of the disclosure, CRB #5 with a higher UL resource allocation possibility may be determined to have a VRB number smaller than that of CRB #11.

Also, referring to (b) of FIG. 30, RB #5 is an RB that is commonly allocated as an FD RB in each FD CRB set list, and may be determined to have the highest UL resource allocation possibility.

Also, referring to an FD CRB set list indicated by an index of FD RB #2, it is apparent that RB #4, RB #8, RB #9, RB #11, RB #16, and RB #17 are additionally configured, compared to an FD CRB set list indicated by an index of FD RB #1. That is, RBs #5, #6, #7 and RBs #12, #13, #14, #15 have been configured as FD CRBs in the FD CRB set list indicated by an index of FD RB #1, and thus, have higher UL resource allocation possibilities than RBs #4, #8, #9, #11, #16, and #17. Therefore, referring to (b) of FIG. 30, after VRBs are sequentially determined for RBs #5, #6, #7 and RBs #12, #13, #14, #15, VRBs may be sequentially numbered for RBs #4, #8, #9, #11, #16 and #17.

Here, although the UE is allocated RBs of nos. 4 to 10 from the BS, CRBs that are VRB-numbered with 4 to 10 for the UE are not present for an index of FD RB #0. Accordingly, the UE does not transmit a UL on FD RB #0. As another example, in a case of an index of FD RB #1, there are CRBs numbered with VRBs #0 to #6. In this case, because the UE is allocated RBs of nos. 4 to 10 for a UL from the BS, the UE may transmit a UL by using CRBs numbered with VRBs #4 to #6.

Figure 31:
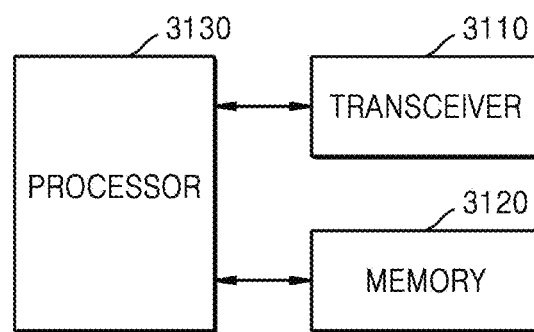
FIG. 31 is a block diagram illustrating a structure of a UE according to an embodiment of the disclosure.

FIG. 31 is a block diagram illustrating a structure of a UE according to an embodiment of the disclosure.

Referring to FIG. 31, the UE may include a transceiver 3110, a memory 3120, and a processor 3130. According to the communication method of the UE described above, the transceiver 3110, the processor 3130, and the memory 3120 of the UE may operate. However, elements of the UE are not limited to the example above. For example, the UE may include more elements than those described above or may include fewer elements than those described above. In addition, the transceiver 3110, the processor 3130, and the memory 3120 may be implemented as one chip. Also, the processor 3130 may include one or more processors.

The transceiver 3110 collectively refers to a receiver of the UE and a transmitter of the UE, and may transmit or receive signals to or from a network entity, a BS, or another UE. The signals being transmitted or received to or from the network entity, the BS, or the other UE may include control information and data. To this end, the transceiver 3110 may include a RF transmitter for up-converting and amplifying a frequency of signals to be transmitted, and an RF receiver for low-noise-amplifying and down-converting a frequency of received signals. However, this is merely an example of the transceiver 3110, and elements of the transceiver 3110 are not limited to the RF transmitter and the RF receiver.

Also, the transceiver 3110 may receive signals through wireless channels and output the signals to the processor 3130, and may transmit signals output from the processor 3130, through wireless channels.

The memory 3120 may store programs and data required for the UE to operate. Also, the memory 3120 may store control information or data included in a signal obtained by the UE. The memory 3120 may include any or a combination of storage media such as read-only memory (ROM), random access memory (RAM), a hard disk, a compact disc (CD)-ROM, a digital versatile disc (DVD), or the like. Also, the memory 3120 may not be separately provided but may be included in the processor 3130.

Also, the processor 3130 may control a series of processes to allow the UE to operate according to the embodiments of the disclosure. For example, the processor 3130 may receive a control signal and a data signal via the transceiver 3110, and may process the received control signal and data signal. Also, the processor 3130 may transmit the processed control signal and data signal via the transceiver 3110. Also, the processor 3130 may control elements of the UE to simultaneously receive a plurality of PDSCHs by receiving DCI consisting of two layers.

According to an embodiment of the disclosure, at least one processor 3130 may control the transceiver 3110 to receive FD CRB information from the BS. Also, the processor 3130 may identify an RE usable for UL data transmission, based on the FD CRB information. Also, the processor 3130 may control the transceiver 3110 to transmit UL data by using the identified RE.

According to an embodiment of the disclosure, the FD CRB information may be indicated by an index corresponding to an FD CRB configuration condition. Also, the FD CRB configuration condition may include at least one of the number of ports, a port type, or transmission power.

According to an embodiment of the disclosure, the processor 3130 may control the transceiver 3110 to receive the FD CRB information by RRC signaling or DCI including the FD CRB information.

According to an embodiment of the disclosure, the processor 3130 may control the transceiver 3110 to receive a CSI-RS by using the identified RE. Also, the processor 3130 may control the transceiver 3110 to transmit, to the BS, a CQI determined based on the received CSI-RS. Also, as transmission power for the RE identified based on the FD CRB information is adjusted, the processor 3130 may adjust transmission power for a PDSCH among the CSI-RS and the PDSCH which are received via the identified RE.

According to an embodiment of the disclosure, the processor 3130 may obtain preset transmission power pattern information from the BS. Also, the processor 3130 may control the transceiver 3110 to receive a transmission power change indicator from the BS at a point of time identified based on the transmission power pattern information. Also, the processor 3130 may measure a CQI based on a CSI-RS transmitted with transmission power changed based on the transmission power pattern.

According to an embodiment of the disclosure, the processor 3130 may control the transceiver 3110 to receive a transmission power indicator from the BS, and may measure a CQI based on a CSI-RS transmitted with transmission power corresponding to the transmission power indicator.

According to an embodiment of the disclosure, the processor 3130 may identify an FD CRB set from the FD CRB information, may determine a VRB number with respect to each FD CRB included in the FD CRB set, based on a resource allocation possibility, and may identify a CRB as an RE, the CRB having a VRB number for an FD CRB corresponding to an RB number allocated as a UL resource.

According to an embodiment of the disclosure, the processor 3130 may identify the FD CRB set from the FD CRB information, may sequentially determine, based on a CRB order, VRB numbers for respective FD CRBs included in the FD CRB set, and may identify a CRB as the RE, the CRB having a VRB number for an FD CRB corresponding to an RB number allocated as a UL resource.

According to an embodiment of the disclosure, the processor 3130 may identify the FD CRB set from the FD CRB information, and may identify an RB as an RE, the RB overlapping in the FD CRB set and a UL PDSCH RB region allocated by an RIV.

Figure 32:
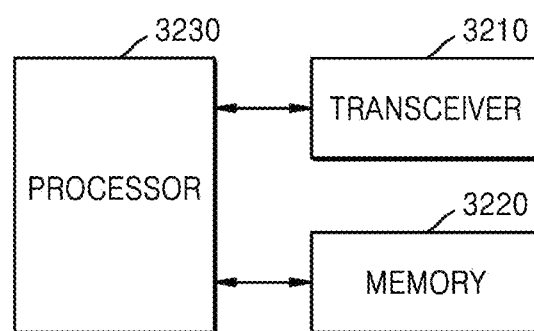
FIG. 32 is a block diagram illustrating a structure of a BS according to an embodiment of the disclosure.

FIG. 32 is a block diagram illustrating a structure of a BS according to an embodiment of the disclosure.

Referring to FIG. 32, the BS may include a transceiver 3210, a memory 3220, and a processor 3230. According to the communication method of the BS described above, the transceiver 3210, the processor 3230, and the memory 3220 of the BS may operate. However, elements of the BS are not limited to the example above. For example, the BS may include more elements than those described above or may include fewer elements than those described above. In addition, the transceiver 3210, the processor 3230, and the memory 3220 may be implemented as one chip. Also, the processor 3230 may include one or more processors.

The transceiver 3210 collectively refers to a receiver of the BS and a transmitter of the BS, and may transmit or receive signals to or from a UE or a network entity. The signals being transmitted or received to or from the UE or the network entity may include control information and data. To this end, the transceiver 3210 may include a RF transmitter for up-converting and amplifying a frequency of signals to be transmitted, and an RF receiver for low-noise-amplifying and down-converting a frequency of received signals. However, this is merely an example of the transceiver 3210, and elements of the transceiver 3210 are not limited to the RF transmitter and the RF receiver.

Also, the transceiver 3210 may receive signals through wireless channels and output the signals to the processor 3230, and may transmit signals output from the processor 3230, through wireless channels.

The memory 3220 may store programs and data required for the BS to operate. Also, the memory 3220 may store control information or data included in a signal obtained by the UE. The memory 3220 may include any or a combination of storage media such as ROM, RAM, a hard disk, a CD-ROM, a DVD, or the like. Also, the memory 3220 may not be separately provided but may be included in the processor 3230.

Also, the processor 3230 may control a series of processes to allow the BS to operate according to the embodiments of the disclosure. For example, the processor 3230 may receive a control signal and a data signal via the transceiver 3210, and may process the received control signal and data signal. Also, the processor 3230 may transmit the processed control signal and data signal via the transceiver 3210. Also, the processor 3230 may control elements of the BS to configure DCI including PDSCH allocation information and to transmit the DCI.

According to an embodiment of the disclosure, at least one processor 3230 may control the transceiver 3210 to obtain FD CRB information and transmit the FD CRB information, and may control the transceiver 3210 to receive UL data by using an RE usable for UL data transmission, the RE being identified based on the FD CRB information.

According to an embodiment of the disclosure, the FD CRB information may be indicated by an index corresponding to an FD CRB configuration condition, and the FD CRB configuration condition may include at least one of the number of ports, a port type, or transmission power.

According to an embodiment of the disclosure, the processor 3230 may control the transceiver 3210 to transmit the FD CRB information by RRC signaling or DCI.

According to an embodiment of the disclosure, the FD CRB information may include information about transmission power to be adjusted for the RE usable for UL data transmission. Here, the processor 3230 may adjust, based on the adjusted transmission power, transmission power for a PDSCH among the PDSCH and a CSI-RS which are transmitted by using the identified RE, and may control the transceiver 3210 to transmit the PDSCH and the CSI-RS, based on a result of the adjustment.

According to an embodiment of the disclosure, the processor 3230 may control the transceiver 3210 to transmit, to the UE, a transmission power change indicator at a point of time for transmission power change, may change transmission power, based on preset transmission power pattern information, and may control the transceiver 3210 to transmit a CSI-RS based on the changed transmission power.

According to an embodiment of the disclosure, the processor 3230 may control the transceiver 3210 to transmit a transmission power indicator to the UE, and may control the transceiver 3210 to transmit a CSI-RS based on transmission power corresponding to the transmission power indicator.

The embodiments of the disclosure described with reference to the present specification and the drawings are merely illustrative of specific examples to easily facilitate description and understanding of the disclosure, and are not intended to limit the scope of the disclosure. In other words, it will be apparent to one of ordinary skill in the art that other modifications based on the technical ideas of the disclosure are feasible. Also, the embodiments of the disclosure may be combined to be implemented, when required. For example, the BS and the UE may be operated in a manner that portions of the first embodiment to the third embodiment of the disclosure are combined with each other.

The invention claimed is:

1. A user equipment (UE) for transmitting and receiving signals in a wireless communication system, the UE comprising:
a transceiver; and
at least one processor operably coupled to the transceiver, the at least one processor configured to:
receive, from a base station (BS), a radio resource control (RRC) message including full duplex carrier resource block (FD CRB) information and FD CRB configuration condition information,
identify, based on the FD CRB information, at least one resource block for an uplink data transmission, and
transmit uplink data based on the at least one resource block,
wherein the FD CRB information is indicated based on an index corresponding to the FD CRB configuration condition information, and
wherein the FD CRB configuration condition information includes characteristic information of the BS that is associated with a self-interference channel.

2. The UE of claim 1, wherein a frequency band of the at least one resource block used for the uplink data transmission and identified based on the FD CRB information corresponds to a partial frequency band among a full frequency band for a downlink data reception from the BS.

3. The UE of claim 1, wherein the at least one processor is further configured to:
receive, from the BS, downlink data based on the at least one resource block for the uplink data transmission.

4. The UE of claim 1, wherein the at least one processor is further configured to:
not receive, from the BS, downlink data based on the at least one resource block for the uplink data transmission.

5. The UE of claim 1, wherein the at least one resource block for the uplink data transmission corresponds to a partial frequency band among a full frequency band, and
a frequency band excluding the partial frequency band among the full frequency band is used for a downlink data reception from the BS.

6. The UE of claim 1, wherein the FD CRB information comprises information for a resource block set comprising the at least one resource block for the uplink data transmission from the UE, and
the information for the resource block set comprises at least one of position information of the at least one resource block, number information, or index information indicating the resource block set.

7. The UE of claim 6, wherein a frequency band of the at least one resource block corresponds to a partial frequency band, among a full frequency band of the BS, allocated from the BS for the UE to receive uplink data, and the frequency band of the at least one resource block is allocated based on the FD CRB configuration condition.

8. A base station (BS) for transmitting and receiving signals in a wireless communication system, the BS comprising:
a transceiver; and
at least one processor operably coupled to the transceiver, the at least one processor configured to;
obtain full duplex carrier resource block (FD CRB) information,
transmit a radio resource control (RRC) message including the FD CRB information and FD CRB configuration condition information, and
receive uplink data based on at least one resource block for an uplink data reception, wherein the at least one resource block is identified based on the FD CRB information,
wherein the FD CRB information is indicated based on an index corresponding to the FD CRB configuration condition information, and
wherein the FD CRB configuration condition information includes characteristic information of the BS that is associated with a self-interference channel.

9. The BS of claim 8, wherein a frequency band of the at least one resource block used for the uplink data reception and identified based on the FD CRB information corresponds to a partial frequency band among a full frequency band for a downlink data transmission to a user equipment (UE).

10. The BS of claim 8, wherein the at least one processor is further configured to:
transmit, to a user equipment (UE), downlink data based on the at least one resource block for the uplink data reception.

11. The BS of claim 8, wherein the at least one processor is further configured to:
not transmit, to a user equipment (UE), downlink data based on the at least one resource block usable for uplink data reception.

12. The BS of claim 8, wherein the FD CRB information comprises information for a resource block set comprising the at least one resource block for the uplink data reception from a user equipment (UE), and
the information for the resource block set comprises at least one of position information of the at least one resource block, number information, or index information indicating the resource block set.

13. A method, performed by a user equipment (UE), of transmitting and receiving signals in a wireless communication system, the method comprising:
receiving, from a base station (BS), a radio resource control (RRC) message including full duplex carrier resource block (FD CRB) information and FD CRB configuration condition information,
identifying, based on the FD CRB information, at least one resource block for an uplink data transmission, and
transmitting uplink data based on the at least one resource block,
wherein the FD CRB information is indicated based on an index corresponding to the FD CRB configuration condition information, and
wherein the FD CRB configuration condition information includes characteristic information of the BS that is associated with a self-interference channel.

14. The method of claim 13, wherein a frequency band of the at least one resource block used for the uplink data transmission and identified based on the FD CRB information corresponds to a partial frequency band among a full frequency band for a downlink data reception from the BS.

15. The method of claim 13, further comprising:
receiving, from the BS, downlink data based on the at least one resource block for the uplink data transmission; or
not receiving, from the BS, downlink data based on the at least one resource block for the uplink data transmission.

16. The method of claim 13, wherein the at least one resource block for the uplink data transmission corresponds to a partial frequency band among a full frequency band, and
a frequency band excluding the partial frequency band among the full frequency band is used for a downlink data reception from the BS.

17. The method of claim 13, wherein the FD CRB information comprises information for a resource block set comprising the at least one resource block for the uplink data transmission from the UE, and
the information for the resource block set comprises at least one of position information of the at least one resource block, number information, or index information indicating the resource block set.

18. The method of claim 17, wherein a frequency band of the at least one resource block corresponds to a partial frequency band, among a full frequency band of the BS, allocated from the BS for the UE to receive uplink data, and
the frequency band of the at least one resource block is allocated based on the FD CRB configuration condition.

* * * * *